(12) United States Patent
Wieland

(10) Patent No.: US 10,044,044 B2
(45) Date of Patent: *Aug. 7, 2018

(54) CATHODE ELECTROCATALYST AND FUEL CELL

(71) Applicant: Friedrich Wilhelm Wieland, Luedenscheid (DE)

(72) Inventor: Friedrich Wilhelm Wieland, Luedenscheid (DE)

( * ) Notice: Subject to any disclaimer, the term of this patent is extended or adjusted under 35 U.S.C. 154(b) by 275 days.

This patent is subject to a terminal disclaimer.

(21) Appl. No.: 14/986,719

(22) Filed: Jan. 3, 2016

(65) Prior Publication Data

US 2016/0118671 A1    Apr. 28, 2016

Related U.S. Application Data

(63) Continuation of application No. 13/782,956, filed on Mar. 1, 2013, now Pat. No. 9,276,268, which is a
(Continued)

(51) Int. Cl.
*H01M 8/10* (2016.01)
*H01M 4/90* (2006.01)
(Continued)

(52) U.S. Cl.
CPC ....... *H01M 4/9041* (2013.01); *H01M 4/8605* (2013.01); *H01M 4/8657* (2013.01); *H01M 4/8663* (2013.01); *H01M 4/8817* (2013.01); *H01M 4/8825* (2013.01); *H01M 4/8853* (2013.01); *H01M 4/8892* (2013.01); *H01M 4/9083* (2013.01); *H01M 4/921* (2013.01); *H01M 4/926* (2013.01);
(Continued)

(58) Field of Classification Search
CPC ............ H01M 4/9041; H01M 4/8657; H01M 4/8825; H01M 4/8605; H01M 4/921; H01M 4/8663; H01M 4/8817; H01M 4/8892; H01M 4/8853; H01M 4/9083; H01M 4/926; H01M 4/886; H01M 4/90; H01M 8/1004; H01M 8/0239; H01M 8/0245; H01M 2004/8689
See application file for complete search history.

(56) References Cited

U.S. PATENT DOCUMENTS

| | | | |
|---|---|---|---|
| 2007/0031722 A1* | 2/2007 | Adzic | H01M 4/8657 429/424 |
| 2010/0086831 A1* | 4/2010 | Fisher | H01M 4/921 429/483 |

* cited by examiner

*Primary Examiner* — Jane Rhee

(57) ABSTRACT

The present invention is related to fuel cells and fuel cell cathodes, especially for fuel cells using hydrogen peroxide, oxygen or air as oxidant. A supported electrocatalyst (204) or unsupported metal black catalyst (206) of cathodes according to an embodiment of the present invention is bonded to a current collector (200) by an intrinsically electron conducting adhesive (202). The surface of the electrocatalyst layer is coated by an ion-conducting ionomer layer (210). According to an embodiment of the invention these fuel cells use cathodes that employ ruthenium alloys $RuMe_I Me_{II}$ such as ruthenium-palladium-iridium alloys or quaternary ruthenium-rhenium alloys $RuMe_I Me_{II} Re$ such as ruthenium-palladium-iridium-rhenium alloys as electrocatalyst (206) for hydrogen peroxide fuel cells. Other embodiments are described and shown.

20 Claims, 28 Drawing Sheets

Related U.S. Application Data continuation-in-part of application No. 12/813,226, filed on Jun. 10, 2010.

(60) Provisional application No. 61/185,981, filed on Jun. 10, 2009, provisional application No. 61/255,479, filed on Oct. 27, 2009, provisional application No. 61/746,563, filed on Dec. 27, 2012.

(51) Int. Cl.
| | |
|---|---|
| *H01M 4/86* | (2006.01) |
| *H01M 8/1004* | (2016.01) |
| *H01M 4/88* | (2006.01) |
| *H01M 4/92* | (2006.01) |
| *H01M 8/0239* | (2016.01) |
| *H01M 8/0245* | (2016.01) |

(52) U.S. Cl.
CPC ....... *H01M 8/0239* (2013.01); *H01M 8/0245* (2013.01); *H01M 8/1004* (2013.01); *H01M 4/886* (2013.01); *H01M 4/90* (2013.01); *H01M 2004/8689* (2013.01); *Y02E 60/521* (2013.01)

Fig. 1    Prior art cathode
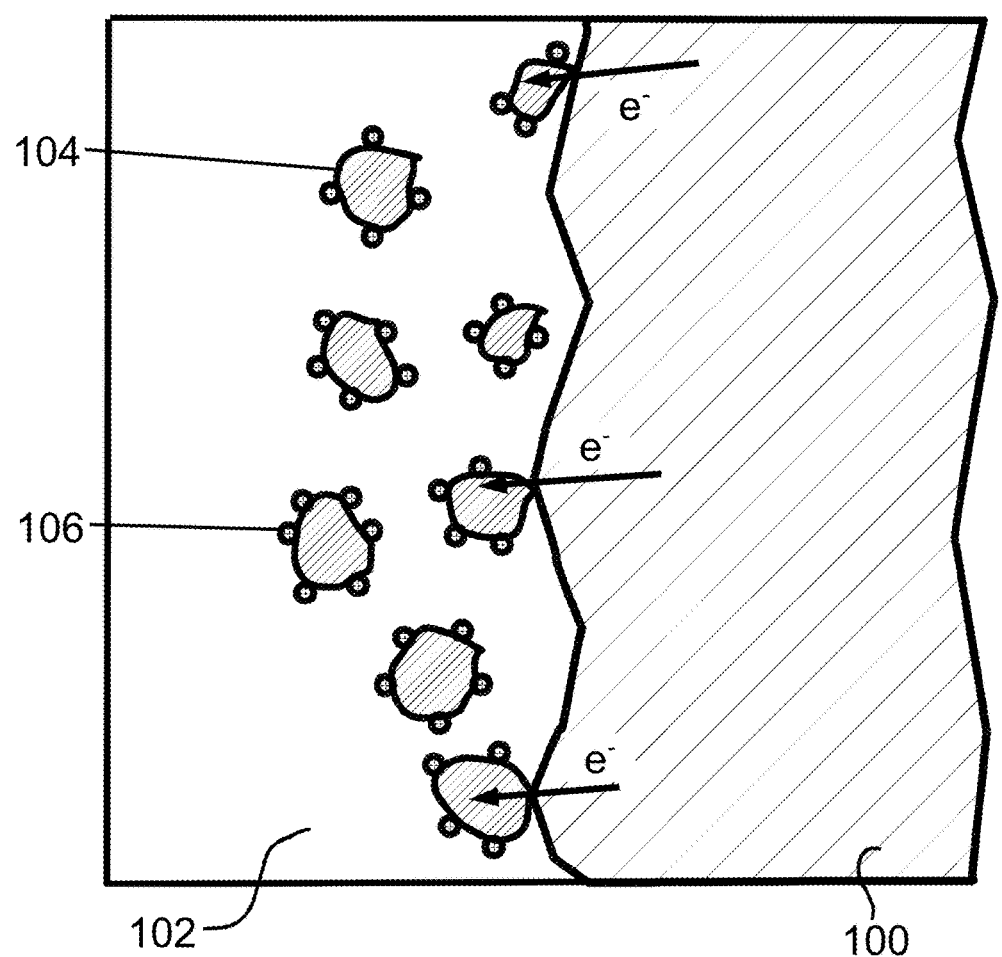

Prior art

Prior art

CATHODE ELECTROCATALYST AND FUEL CELL

CROSS-REFERENCE TO RELATED APPLICATIONS

This application is a continuation of, and claims priority under 35 U.S.C. § 120 to, U.S. application Ser. No. 13/782,956, filed Mar. 1, 2013, now U.S. Pat. No. 9,276,268, which claims benefit under 35 U.S.C. § 119(e) of U.S. Provisional Patent Application 61/746,563, filed Dec. 27, 2012 by the present inventor and which is a continuation-in-part of, and claims priority under 35 U.S.C. § 120 to, U.S. application Ser. No. 12/813,226, filed Jun. 10, 2010, now abandoned, which claims benefit under 35 U.S.C. § 119(e) of U.S. Provisional Patent Application Ser. No. 61/185,981 filed Jun. 10, 2009 by the present inventor and U.S. Provisional Patent Application Ser. No. 61/255,479 filed Oct. 27, 2009 by the present inventor. Each patent application identified above, which are not admitted to be prior art with respect to the present invention by its mention in the background or cross-reference section, is incorporated here by reference in its entirety to provide continuity of disclosure.

FIELD OF THE INVENTION

This invention relates to cathodes for fuel cells. More specifically the invention relates to cathodes for fuel cells that use hydrogen peroxide, oxygen or air as oxidants. The invention also relates to semi fuel cells like Magnesium/hydrogen peroxide semi fuel cells that can replace conventional primary batteries.

BACKGROUND

Fuel cells and semi fuel cells that use hydrogen peroxide or oxygen as oxidant are environmentally friendly methods for generating electricity. They don't produce toxic reaction products during discharge as water is the only product of the use of these oxidants in fuel cells according to the reactions

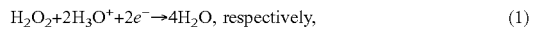

$$H_2O_2+2H_3O^++2e^-\rightarrow 4H_2O, \text{ respectively,} \qquad (1)$$

$$O_2+4H_3O^++4e^-\rightarrow 6H_2O. \qquad (2)$$

The electrochemical potential calculated from thermodynamic data is +1.77 V for reaction (1) at pH=0, +1.23 V for reaction (2) but the values reached in practice are significantly lower especially for prior art fuel cell cathodes at current densities of 40-100 mA/cm².

High performance fuel cells would be a perfect power supply for electrically powered cars as fuel cells can reach an efficiency that is much larger than the efficiency of combustion engines which is limited by the Carnot efficiency $\eta=1-T_1/T_2$ determined by the temperatures $T_1$ of the cold and $T_2$ of the hot reservoir and reaches values of typically less than 40% while a fuel cell could reach higher efficiencies. Moreover fuel cells are intrinsically safer than lithium batteries of the same capacity as only small amounts of educts are present in the fuel cell at the same time and can be stored separately while all highly reactive lithium metal and cathode material, an oxidizer, are mounted next to each other so damage of the separator may result in a violent exothermic reaction of the whole lithium stored in the battery.

However reaction (1) is rather slow and requires more efficient electrocatalysts in order to reach a low polarization at current densities of 10 mA/cm² and above. Cathodes with prior art electrocatalysts still cannot reach low polarizations at current densities of 100 mA/cm² and above and suffer from other disadvantages like strong hydrogen peroxide decomposition.

In spite of substantial efforts to develop improved oxygen and hydrogen peroxide cathodes for fuel cells during the last five decades the power density that could be reached by such fuel cells is still fairly limited as the polarization of the cathodes is already quite large at rather small current densities due to small value of the exchange current densities $j_0$ for the above reactions (1) and especially (2).

In addition rather large amounts of very expensive catalysts like platinum and platinum alloys have to be used in order to reach current densities required for an electrically powered car as the catalyst utilization is quite low (about 9% for typical PEM-fuel cells). An estimate for the manufacturing costs of the electrodes of a fuel cell for an electrically powered car was $50-100 per kW according to S. Srinivasan ("Fuel Cells", Springer, 2006, p. 603). For an electrically powered car with the performance of conventional cars (80 kW power) manufacturing costs of $4000-$8000 for the electrodes alone would be therefore expected.

State of the art fuel cell electrodes for polymer electrolyte membrane (PEM) fuel cells are produced by a coating process using an ink of catalyst mixed with a dispersion of fluoropolymer ionomer like copolymers of tetrafluoroethylene and perfluorovinylether sulfonic acid commonly sold under the trademark "NAFION" by E.I. DuPont de Nemours and Company, Wilmington, Del. Such an electrode is shown in FIG. 1. The supported catalyst (104) with platinum, palladium or iridium electrocatalyst centers (106) is randomly distributed in the catalyst-ionomer layer (102) formed from the ink on a conducting current collector (100). Up to now in spite of tremendous research efforts over many decades researchers didn't recognize the disadvantages that arise from this random electrode structure.

"NAFION" is an ion conductor that is not electron-conducting. But in order to act as an electrocatalyst a catalyst particle must take up electrons from the current collector of the cathode as it is shown by the arrows in FIG. 1 illustrating the flow of electrons within the cathode. Therefore catalyst utilization is reduced by the random dispersion of the catalyst in a non-electron-conducting polymer as only the fraction of the catalyst that is in electrical contact to the current collector is acting as electrocatalyst for production of electrical energy.

Moreover prior art catalysts like platinum, palladium-iridium or gold for hydrogen peroxide cathodes according to reaction (1) show strong polarization at rather small current densities of 10 mA/cm². According to the literature magnesium/hydrogen peroxide-semi fuel cells (open circuit voltage 2.1 V) with conventional cathodes can deliver only a voltage of 1.3 V at current densities of 40 mA/cm² and 25 ml/min flow rate. The situation is similar for oxygen cathodes according to reaction (2) due to the very low exchange current density $j_0$.

Besides efficient prior art electrocatalysts like palladium-iridium (50 atomic-%) cannot be used in concentrated catholyte solutions comprising hydrogen peroxide (c(H$_2$O$_2$) >0.5 mole/l) that would be useful for high power density fuel cells that operate at high current densities because of decreasing efficiency of prior art electrocatalyst palladium-iridium (50 at.-% Ir) at c(H$_2$O$_2$)>0.25 mole/l for reaction (1). This prior art electrocatalyst generates much oxygen by catalytical hydrogen peroxide decomposition according to $$(3) \quad 2H_2O_2 \rightarrow 2H_2O+O_2.$$

The energy density decreases from over 700 Wh/kg (for c(H$_2$O$_2$)=0.03 mole/l) to about 400

Wh/kg (for $c(H_2O_2)=0.25$ mole/1) because of this parasitic reaction instead of an expected increase due to the reduced mass of the catholyte because of the reduced water content in the catholyte as a result of the increased hydrogen peroxide concentration.

Information relevant to attempts to address these problems can be found in U.S. Patent Applications No. 2008/0182153 A1, 2008/0193827 A1, 2008/0063922 A1, 2008/0054226 A1, 2004/0224218 A1, 2004/0191605, U.S. Pat. Nos. 7,175,930, 5,296,429, 5,445,905, 6,465,124 and the articles Electrochemistry Communications 10 (2008), 1610, in print, Journal of Power Sources 165 (2007), 509 and Journal of Power Sources 164 (2007), 441.

However, each one of these references suffers from one or more of the following disadvantages as long diffusion paths for educts (the oxidants $H_2O_2$ or $O_2$ and $H_3O^+$) and products ($H_2O$) from the electrolyte to the electrocatalyst and vice versa, limited durability of electrodes, high costs of the catalysts, high manufacturing costs due to complicated manufacturing processes, strong decomposition of hydrogen peroxide at the surface of the catalyst and low utilization efficiency of hydrogen peroxide, impracticality of the use of concentrated solutions of hydrogen peroxide, strong polarization at large current densities and low utilization of the catalyst due to a missing conduction path for electrons.

For the foregoing reasons, there is a need for hydrogen peroxide cathodes and oxygen cathodes for fuel cells that are more efficient, less expensive to manufacture and durable and that can deliver higher current densities with lower polarizations and that can be operated in concentrated solutions of hydrogen peroxide.

SUMMARY

The present invention is directed to fuel cell cathodes that satisfy this need. Fuel cell cathodes having features of the invention comprise an electrode structure that has an optimized topology for the transport of educts and products of the cathode reaction (1) or (2) as well as the transport of electrons involved in the cathode reaction.

A fuel cell cathode according to an embodiment of the invention (main embodiment 1—cathode for liquid electrolyte fuel cells such as a hydrogen peroxide cathode comprising intrinsically electron-conducting adhesives) comprises an electrocatalyst that is bonded to the current collector using an adhesive that is intrinsically conducting electrons. This increases the number of catalyst particles of the electrocatalyst layer that are electrically connected to the current collector by the electron-conducting adhesive. Therefore the catalyst utilization is larger than in prior-art electrodes using random distribution of catalyst particles in a polymer that does not conduct electrons.

The catalyst layer is coated by an ion conducting layer of an ionomer such as a copolymer of tetrafluoroethylene and a perfluorovinyl ether sulfonic acid commonly sold under the trademark "NAFION" by E.I. DuPont de Nemour and Company, Wilmington, Del. This thin ionomer layer ensures efficient transport of educts of the cathode reaction like the oxidants $H_2O_2$ or $O_2$ and $H_3O+$ and product (water) by diffusion. The ionomer layer also protects the catalyst layer against abrasion and improves durability of the cathode and wettability of the catalyst layer. This topology ensures optimum electronic and ionic conductivity as well as optimum transport of oxidizer and water.

The catalyst can be a supported electrocatalyst (such as platinum on carbon) or an unsupported catalyst (such as platinum black) and consist of any platinum metal, transition metal, bismuth, tin or aluminum or alloys thereof.

For hydrogen peroxide cathodes ruthenium or ruthenium based alloys are preferred according to an embodiment (main embodiment 1C—catalysts for hydrogen peroxide cathodes) of the invention as ruthenium and ruthenium-based alloys are more effective electrocatalysts for the electrochemical reduction of hydrogen peroxide in concentrated solutions (c>1 mol/l) than prior art electrocatalysts. Ruthenium catalyzed hydrogen peroxide cathodes have a more positive open cell potential and can therefore deliver a higher open cell voltage in a fuel cell than hydrogen peroxide cathodes using prior art electrocatalysts. Besides the polarization of hydrogen peroxide cathodes using ruthenium alloy electrocatalysts in 2.32 M $H_2O_2$ solutions is lower than the polarization of hydrogen peroxide cathodes using other electrocatalysts while the rate of generation of oxygen by catalytical hydrogen peroxide decomposition (3) $2H_2O_2 \rightarrow 2H_2O+O_2$ is significantly lower for ruthenium-based electrocatalysts than for other prior art electrocatalysts. Moreover durability of ruthenium-based electrocatalysts in hydrogen peroxide is excellent. In addition they are considerably less expensive than other platinum metals that are used as prior-art electrocatalysts.

According to an embodiment of the present invention binary ruthenium alloys $RuMe_I$ with small amounts (2 at.-%) of metal $Me_I$ selected from the group consisting of palladium, iridium, rhenium, platinum, osmium, and rhodium are preferred as electrocatalysts for hydrogen peroxide cathodes. Alloys with $Me_I$ selected from the group consisting of palladium, iridium, and rhenium are more preferred. Ternary alloys $RuMe_I Me_{II}$ with $Me_{II}$ selected from the group consisting of palladium, iridium, rhenium, platinum, osmium, and rhodium with $Me_{II}$ different from $Me_I$ such as ruthenium-palladium-iridium, ruthenium-palladium-rhenium, and ruthenium-iridium-rhenium using a small amount of rhenium as additive are most preferred, quaternary alloys ruthenium-palladium-iridium-rhenium are optimum.

According to a further embodiment of the present invention electrocatalysts selected from the group consisting of platinum, ruthenium, rhodium, osmium, rhenium, palladium, iridium, chromium, cobalt, nickel, manganese, vanadium, silver, titanium, tungsten, aluminum, tin, silicon, molybdenum, bismuth, and alloys thereof are preferred electrocatalysts for oxygen cathodes.

According to a version of the invention the material of the current collector is chosen that is resistant against corrosion by the electrolyte and can consist of carbon paper, carbon fiber fabric, titanium, or conducting polymers.

The preferred electron conducting adhesive comprises an intrinsically electron conducting polymer like polyaniline and a dopant. According to an embodiment of the invention an ionomer such as "NAFION" may be used as a dopant in an acidic catholyte to obtain an adhesive of excellent electrical conductivity if the electrode is wetted by a electrolyte such as dilute sulfuric acid. Besides this adhesive offers good ionic conductivity for hydronium ions and allows transport of the oxidant hydrogen peroxide by diffusion.

According to an embodiment of the invention the ruthenium electrocatalyst or ruthenium-based alloy electrocatalyst can be deposited after bonding the supporting carbon by a process comprising a step of coating the cleaned electrode by electroplating or by electroless plating on a electrode that is cleaned and catalyzed by deposition of palladium atoms. A plating bath that comprises a ruthenium nitridochloro complex is preferred for electroplating.

For oxygen cathodes according to main embodiment 2—PEM-fuel cell membrane electrode assemblies comprising intrinsically electron conducting adhesives various cathode designs are presented that maximize surface area and oxygen diffusion.

According to an embodiment of the invention the electron conducting adhesive composition comprises an intrinsically electron-conducting polymer like polyaniline, a fluoropolymer ionomer like "NAFION" and a solvent like dimethyl sulfoxide, dimethyl formamide or N-methyl pyrrolidinone. According to an embodiment of the invention an intrinsically electron conducting pressure sensitive adhesive (PSA) further comprising an elastomer and a tackifier is preferred as electron conducting adhesive.

BRIEF DESCRIPTION OF THE DRAWINGS

These and the other features, aspects and advantages of the present invention will become better understood with regard to the following description, appended claims and accompanying drawings, where:

FIG. 1 shows a sectional view of a portion of a prior-art fuel cell electrode with flow of electrons from the current collector to the catalyst particles active as electrocatalyst;

These and the other features, aspects and advantages of the present invention are better understood with respect to the following description and appended claims.

DETAILED DESCRIPTION

Figure 2A:
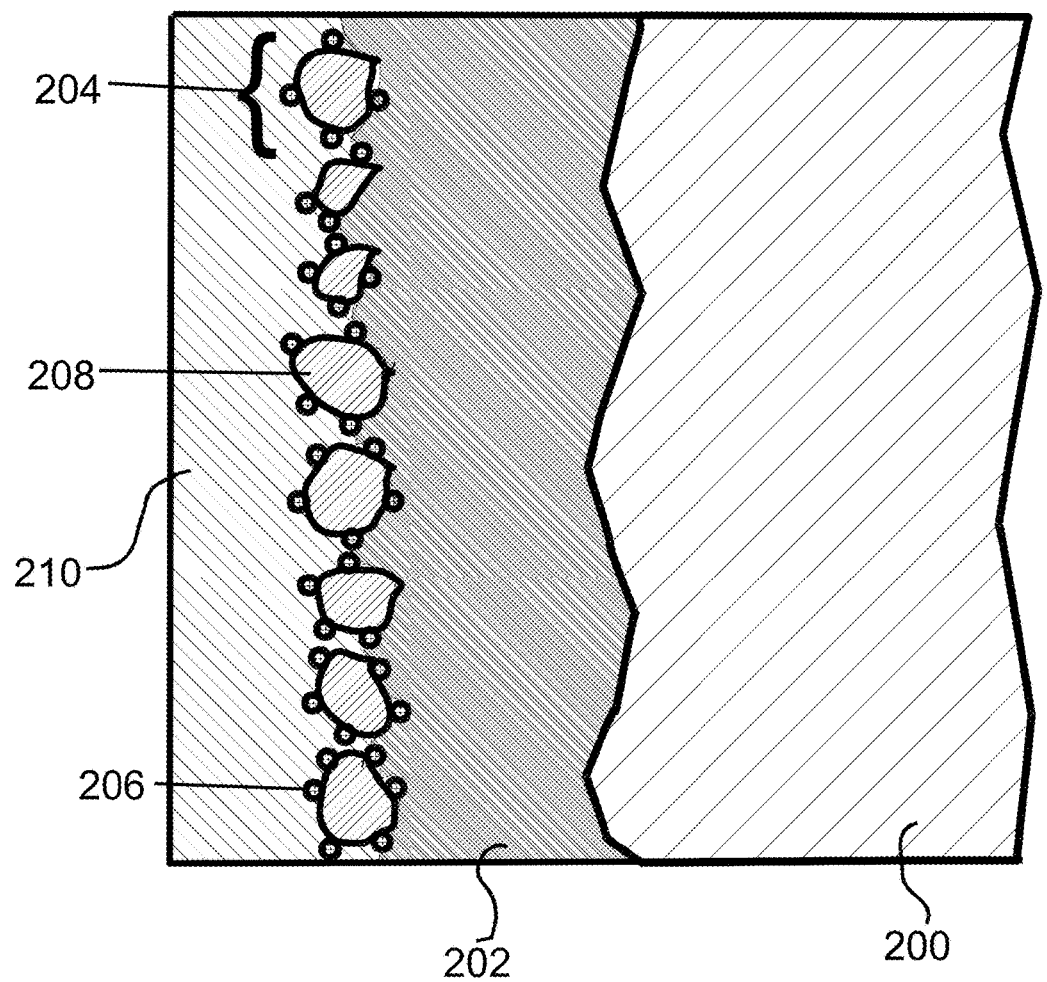
FIG. 2A shows a sectional view of a portion of a hydrogen peroxide cathode as an embodiment of the present invention.
Figure 2B:
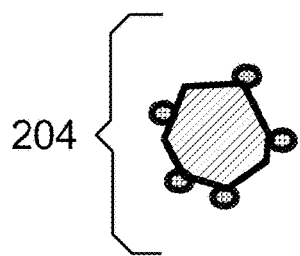
FIG. 2B shows a sectional view of a particle of a supported electrocatalyst with ruthenium alloy metal centers.
Figure 2C:
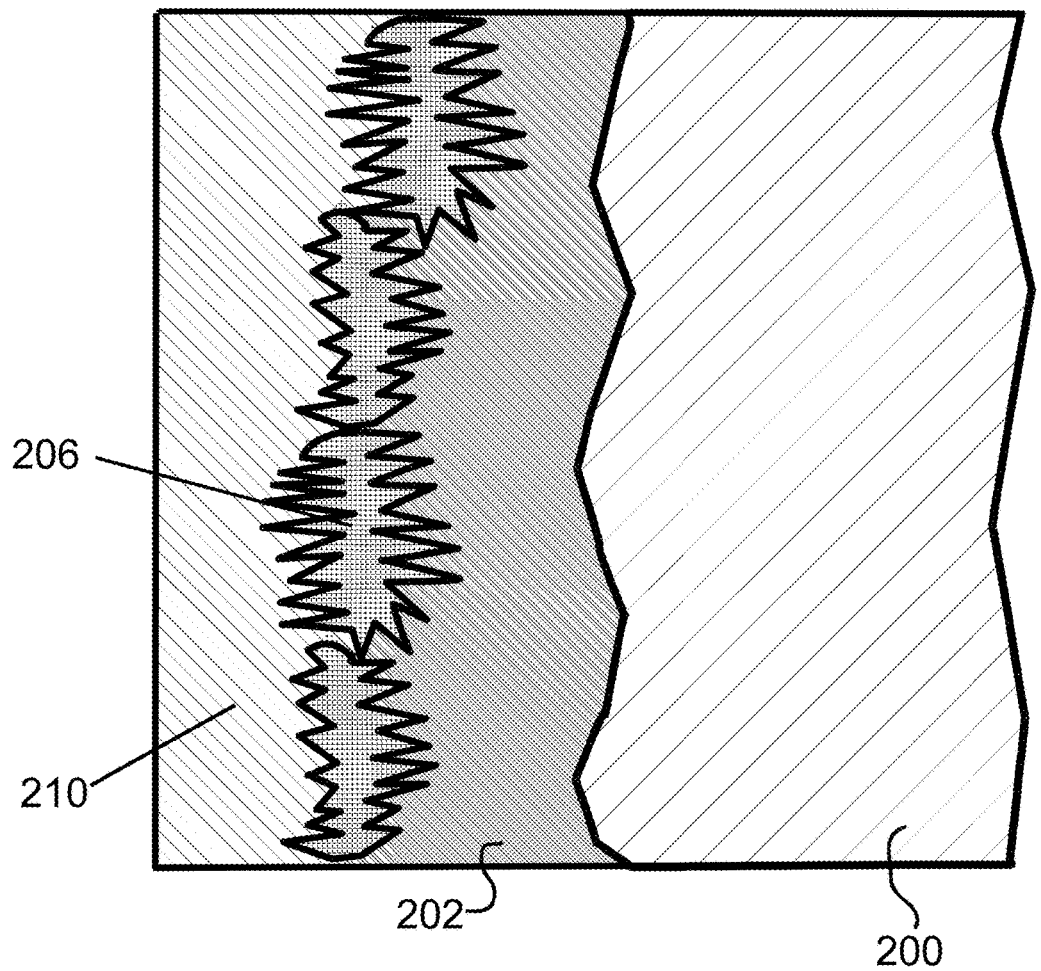
FIG. 2C shows a sectional view of a portion of a hydrogen peroxide cathode with unsupported electrocatalyst as a further embodiment of the present invention.
Figure 2D:
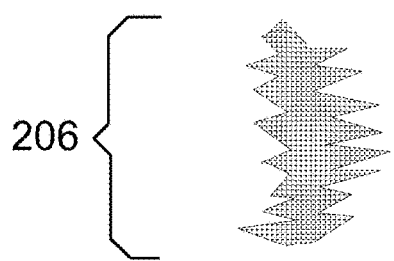
FIG. 2D shows a sectional view of an unsupported metal black electrocatalyst particle.

Main Embodiment 1—Cathode for Liquid Electrolyte Fuel Cells Such as a Hydrogen Peroxide Cathode Comprising Intrinsically Electron-Conducting Adhesives As shown in FIG. 2A a cathode according to an embodiment of the present invention comprises a current collector (200) that is coated by a layer of an adhesive (202) that is conducting electrons. The adhesive (202) bonds particles of the electrocatalyst (204, cf. FIG. 2B) to the current collector. This ensures good electrical contact of the electrocatalyst to the current collector that is required in order to increase the utilization of the electrocatalyst. The adhesive may be applied by screen printing, painting or other techniques used to apply an adhesive.

As electrocatalyst a supported catalyst like platinum metals (206) on carbon (208) or an unsupported catalyst like platinum black may be used.

The cathode further comprises an ion-conducting coating (210) of the catalyst particles that consists of an ionomer. This coating ensures good ionic conductivity at the surface of the catalyst particles and good wetting of the cathode. It also ensures efficient transport of educts of the cathode reaction like $H_2O_2$ or $O_2$ and $H_3O^+$-ions to the electrocatalyst and transport of the reaction product water from the electrocatalyst to the electrolyte.

The ionomer coating also increases durability of the cathodes as it also acts like a polymer coating reinforcing catalyst particles in the catalyst layer.

The topology of a cathode according to an embodiment of the invention as shown in FIG. 2A thus optimizes the above conductivity and minimizes diffusion problems that occur in prior art fuel cell cathodes. Besides this topology also increases utilization of the catalyst as more catalyst particles are electrically connected to the current collector which helps to reduce catalyst loading and costs. Moreover it allows use of high surface area supported electrocatalysts and metal black electrocatalysts with a high surface area that minimizes polarization.

According to an embodiment of the present invention the current collector (200) can consist of carbon paper, carbon fiber fabric, titanium mesh or titanium meshed metal baffle and pressed carbon rovings with a binder but other material might be suitable, too. The current collector (200) can also comprise conducting polymers such as polyanilines, polythiophenes, and polypyrroles.

Carbon paper like the material commonly sold under the trademark "Toray TGP-H-060" (190 μm thickness) or "TGP-H-120" (370 μm thickness) by Toray Industries America Inc., New York, N.Y. is preferred. The latter TGP-H-120 is most preferred for fuel cells that are subject to stronger mechanical stress like in automotive applications. Carbon fiber fabric, pressed carbon fiber rovings and titanium mesh or titanium meshed metal baffle are preferred less expensive alternatives of good conductivity and excellent corrosion resistance in electrolytes containing acids and hydrogen peroxide.

As electron-conducting adhesive (202) an adhesive is preferred that comprises an intrinsically electron-conducting polymer. This is advantageous compared to conventional conducting adhesives that contain graphite or silver particles that have a size similar to or larger than the size of the electrocatalyst particles (204). A conducting adhesive that is intrinsically conducting electrons can provide electrical contact even to very small catalyst particles that are much smaller than the conducting graphite or silver particle additives of conventional conducting adhesives embedded in a non-conducting matrix. Therefore the use of an intrinsically conducting adhesive ensures electrical contact of an increased number of electrocatalyst particles (204) to the current collector (200) as even a very small adhesive link can provide an electrical connection to the current collector (see FIG. 2) that would consist of non-conducting polymer in a conventional conducting graphite- or silver-based adhesives. Besides conventional adhesives that contain silver would dissolve in an electrolyte of a fuel cell that uses an acidic hydrogen peroxide solution as oxidizer.

As intrinsically conducting polymer of the conducting adhesive (202) a large number of polymers are suitable. Polyaniline (PANI) is a preferred intrinsically conducting polymer as it is less expensive and commonly available from a number of manufacturers like Ormecon Chemie GmbH&Co. KG, D-22941 Ammersbeck, Germany. Besides polyaniline is stable in electrolytes that contain strong oxidizers like hydrogen peroxide and it offers excellent conductivity. Nevertheless a large number of copolymers of aniline with derivatives of aniline such as anthranilic acid or monomers of other conducting polymers such as thiophene, pyrrole, furane, as well as a large number of other intrinsically conducting polymers like polythiophenes, for example poly(3,4-ethylenedioxythiophene) (PEDOT), polypyrroles, polyfuranes, polyparaphenylenes, polyazulenes, polyindoles, polypyridines, polypyrazines, polytriazines, polythiazoles, polyimidazoles, polyquinolines, polybenzimidazoles, polytriazoles, polyoxydiazoles, polythianaphthenes, polycarbazoles, polybenzothiophenes, polybenzofuranes, polyheptadiyne, polyparaphenylene, and polyparaphenylene vinylene and their substituted derivatives and copolymers may be also suitable intrinsically conducting polymers for the conducting adhesive (202).

Besides copolymers of conducting polymers like polythiophenes with acrylates can be used as intrinsically electrically conducting polymers in the adhesive (202). For example the adhesive can comprise doped poly(3,4-ethylenedioxythiophene) (PEDOT) that is tetramethacrylate end-capped which is commonly sold under the trademark "OLIGOTRON" by TDA Research Inc., Wheat Ridge, Colo., as a solution in nitromethane. Such adhesives can be cured thermally or by ultraviolet light. Thermal curing is preferred.

The adhesive (202) may also comprise a dopant if the polymer is not self-doped like polyaniline-polyanthranilic acid copolymers. Alternatively doped electron-conducting polymers (for example PANI emeraldine salts) can be used. As dopants Brønsted acids like hydrochloric acid, sulfuric acid, perchloric acid as well as carboxylic acids or sulfonic acids like methanesulfonic acid, p-toluenesulfonic acid, dodecylbenzene sulfonic acid (DBSA), dinonyl naphthalene sulfonic acid, camphor sulfonic acid (CSA), or polymeric acids like poly(styrenesulfonic acid) as in PEDOT:PSS commonly sold under the trademark "CLEVIOS P" by H. C. Stark, GmbH, D-38642 Goslar, Germany, can be used. Alternatively a polymer like polyaniline can be N-alkylated in order to produce conducting N-alkyl-polyanilines.

Instead of conventional dopants ionomers that have acidic groups like sulfonic acid groups can be used as dopants. This is more preferred as ionomers are also ion-conducting. An adhesive (202) that comprises an ionomer is therefore electron-conducting and ion-conducting at the same time. Copolymers of tetrafluoroethylene and a perfluorovinyl ether sulfonic acid that are commonly sold under the trademark "NAFION" by E.I. DuPont de Nemours and Company are most preferred ionomers as dopants for the intrinsically conducting adhesive (202). An adhesive that comprises a solution of polyaniline (emeraldine base) and "NAFION" in an organic solvent provides a suitable bonding strength and excellent electron-conductivity when immersed in the acidic electrolyte of the fuel cell. The adhesive may be further comprising a solvent for polyaniline (emeraldine base) such as dimethyl sulfoxide (DMSO), dimethyl formamide and N-methyl pyrrolidinone although other solvents might be suitable, too. More preferred are dispersions of PANI and "NAFION" in mixtures of DMSO and alcohols (such as propanol) and water. Preferred are also solutions of PEDOT: PSS and "NAFION" in alcohol/water as intrinsically electron conducting adhesives (202).

Intrinsically conducting pressure sensitive adhesives are most preferred conducting adhesives as they simplify production of cathodes. A polyaniline-dopant complex like PANI-dodecylbenzene sulfonic acid (PANI-DB SA) that is soluble in an organic solvent like p-xylene can be used for production of an intrinsically conducting PSA further comprising an elastomer and a tackifier like poly-α-pinene although other tackifiers such as polylimonene, colophony and its esters or tackifiers obtainable from MQ silicones might be suitable, too.

A through-plane area resistivity of the adhesives of less than 2.2 Ohm cm$^2$ is preferred, an area resistivity of less than 0.2 Ohm cm$^2$ is more preferred, an area resistivity of less than 0.1 Ohm cm$^2$ is most preferred. An area resistivity of less than or equal to 0.021-0.05 Ohm cm$^2$ is optimum in order to limit the ohmic voltage drop in the adhesive layer.

The thickness of the adhesive layer between 0.1 μm and 100 μm is preferred although adhesive layers of a larger or smaller thickness might be useable, too. The thickness of the adhesive layer between 0.5 μm and 60 μm is more preferred, a thickness between 5 μm and 50 μm is most preferred and a thickness between 10 μm and 40 μm is optimum.

As electrocatalyst (206) any transition metal catalyst, any main group element and all alloys thereof may be used. For oxygen or air cathodes platinum, silver, nickel are well known effective prior art catalysts. Recently alloys of platinum with chromium, vanadium, titanium, tungsten, aluminum, tin, silicon, nickel, cobalt, iron, manganese, and molybdenum were developed for cathodes of hydrogen-oxygen fuel cells.

For cathodes using hydrogen peroxide as oxidant platinum, palladium, iridium, gold, silver, niobium, nickel, nickel-aluminum, titanium, titanium boride, iridium oxide, glassy carbon, porphyrine complexes, peroxidase, cobalt, tungsten, bismuth and palladium-iridium alloys were extensively tested in prior art references as electrocatalysts. Palladium-iridium nanoparticles and binary as well as ternary palladium, iridium, cobalt, tungsten, bismuth, and molybdenum alloys were tested recently as more or less effective catalysts.

Main Embodiment 1C—Catalysts for Hydrogen Peroxide Cathodes

According to an embodiment of this invention ruthenium, osmium, and rhenium are effective catalysts for hydrogen peroxide cathodes in concentrated hydrogen peroxide catholytes. The latter two metals (Os, Re) dissolve in acidic hydrogen peroxide solutions as the electrode potentials Re/Re$^{3+}$ (E$^0$=+0.30V) and Os/OsO$_4$ (E$^0$=+0.838V) are lower than the potential of H$_2$O$_2$ (E$^0$=+1.77V). Thin films of osmium and rhenium dissolve within a few seconds. It can be expected that technetium would be also a more or less effective catalyst that might dissolve under these conditions, too. Therefore these metals rhenium and osmium may be used as alloys with other noble metals that are corrosion resistant in such catholytes.

Figure 7:
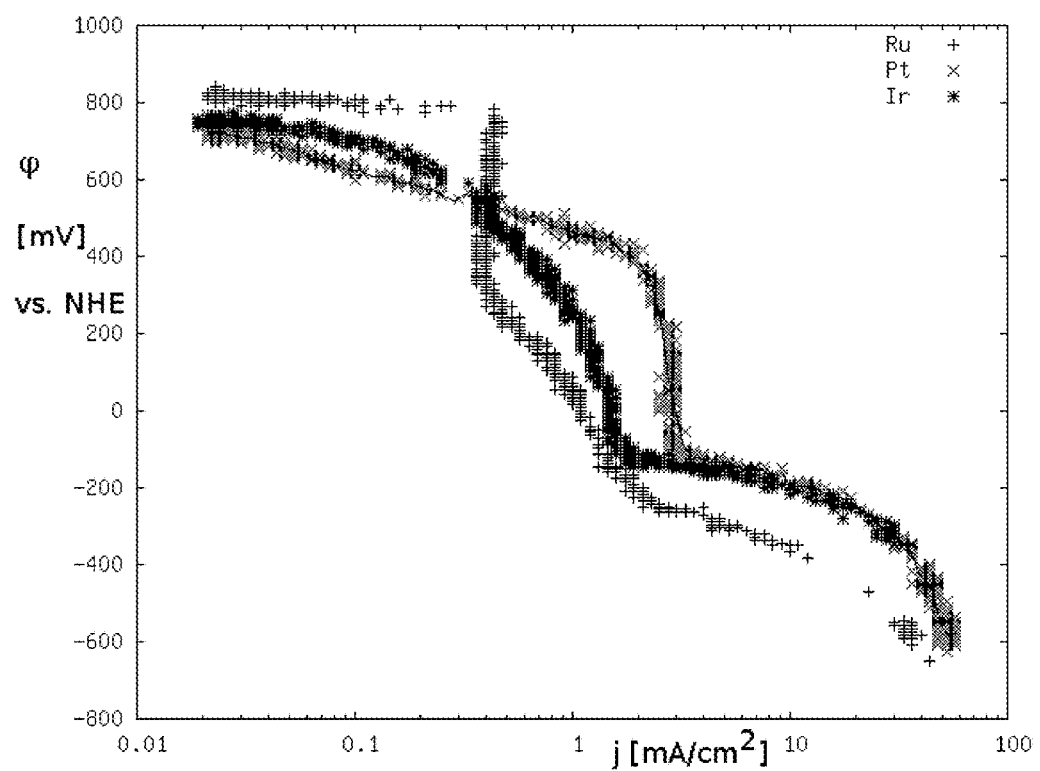
FIG. 7 shows a comparison of prior art electrocatalysts platinum and iridium to ruthenium in 0.01M $H_2O_2$/0.5M $H_2SO_4$. Ruthenium appears to be a less active electrocatalyst under these conditions at current densities >0.4 mA/cm².

It is surprising that ruthenium does not dissolve in acidic concentrated hydrogen peroxide solutions in spite of an electrode potential of Ru/Ru$^{2+}$ of only E$^0$=0.455V as Ruthenium anodes readily dissolve in dilute (0.5 M) sulfuric acid during anodic polarization under formation of Ruthenium tetroxide (RuO$_4$). It was discovered that ruthenium metal is stable and doesn't dissolve in 2.32 M solutions of hydrogen peroxide in sulfuric acid and that ruthenium is a more efficient electrocatalyst for cathodes of fuel cells using concentrated hydrogen peroxide as oxidant than prior art electrocatalysts palladium, iridium and significantly superior to palladium-iridium alloys regarding catalyst stability and parasitic hydrogen peroxide decomposition. This excellent electrocatalytical activity in 2.32 M H$_2$O$_2$ solution is quite surprising as it was found that ruthenium is an inferior electrocatalyst in a dilute 0.01 M H$_2$O$_2$/0.5 M H$_2$SO$_4$ catholyte (that was typically used in the literature for evaluation of electrocatalysts for hydrogen peroxide reduction) compared to prior art electrocatalysts such as the more efficient platinum (see FIG. 7) or iridium or the less efficient palladium and the most efficient prior-art electrocatalyst palladium-iridium. Alloys of palladium with ruthenium showed only little advantage compared to palladium in a catholyte comprising 0.03 M H$_2$O$_2$.

As most prior art electrocatalysts for hydrogen peroxide reduction are also strongly catalyzing hydrogen peroxide decomposition according to reaction (3) it is surprising that ruthenium and alloys of ruthenium show a significantly reduced parasitic decomposition of hydrogen peroxide and oxygen evolution in spite of excellent electrocatalytical activity.

It was found that ruthenium alloys RuMe$_I$ with Me$_I$ selected from the group consisting of palladium, iridium, rhenium, platinum, osmium, and rhodium are superior to pure ruthenium metal as electrocatalyst for fuel cells using concentrated hydrogen peroxide solutions with c(H$_2$O$_2$)>1 mol/l. Preferred metals Me$_I$ are palladium, iridium, and rhenium.

It is surprising that even small amounts of alloy component Me$_I$ of palladium, iridium or rhenium in the range of 10 ppm start to reduce polarization at current densities of j>10 mA/cm$^2$. Contents of metals Me$_I$ of less than 50 at.-% are preferred because of the higher open cell voltage, contents of less than 5 at.-% are most preferred. In spite of the small content of Me$_I$ such alloys have a significantly higher electrocatalytical activity than ruthenium. Alloys RuMe$_I$ with 1-2 at.-% Me$_I$ are optimum. Moreover rhenium as additive Me$_I$ increases the open cell voltage of fuel cells using such a hydrogen peroxide cathode.

Therefore, the corresponding ruthenium-content of such a binary alloy is x(Ru)=100 at.-%-x(Me$_I$) and a resulting atomic ratio for ruthenium between 50 at.-% and 99.99 at.-% is preferred, a ruthenium content between 90 at.-% and 99.9 at.-% is more preferred, a ruthenium content of 95 at.-% to 99 at.-% is most preferred for these binary electrocatalysts and a content between 98 at.-% and 99 at.-% is optimum for these binary catalysts. This value x(Ru) may also include the atomic ratio of incidental and impurities, too.

Figure 10:
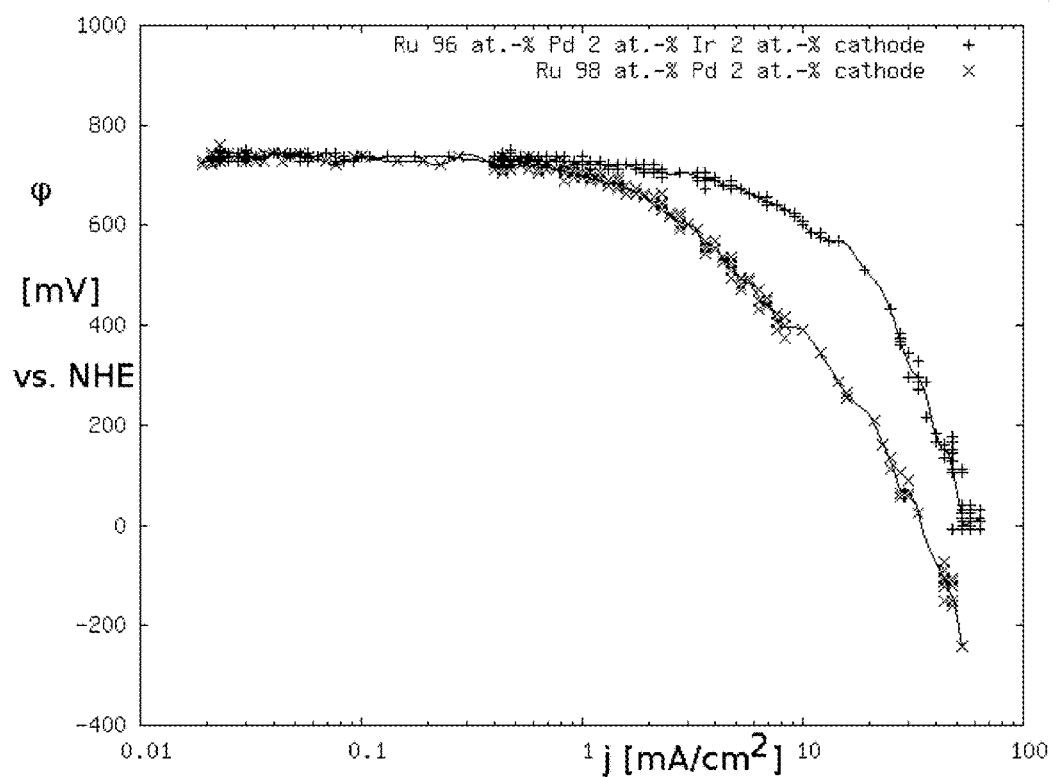
FIG. 10 shows a comparison of the most preferred ternary ruthenium alloy Ru 96 at.-% Pd 2 at.-% Ir 2 at.-% to binary ruthenium alloy Ru 98 at.-% Pd 2 at.-%.

It was found that particular ternary ruthenium alloys RuMe$_I$Me$_{II}$ with Me$_I$, Me$_{II}$∈{Pd, Ir, Re, Pt, Os, Rh}, Me$_I$≠Me$_{II}$ are even particularly superior to the above binary alloys RuMe$_I$ electrocatalysts especially at current densities j>20 mA/cm$^2$ (see FIG. 10). Ternary ruthenium alloys RuMe$_I$Me$_{II}$ with Me$_I$=palladium, Me$_{II}$=iridium (i.e. RuPdIr)

are most preferred, quaternary ruthenium alloys further comprising rhenium $RuMe_I Me_{II} Re$ are optimum electrocatalysts for hydrogen peroxide fuel cell cathodes.

Figure 6:
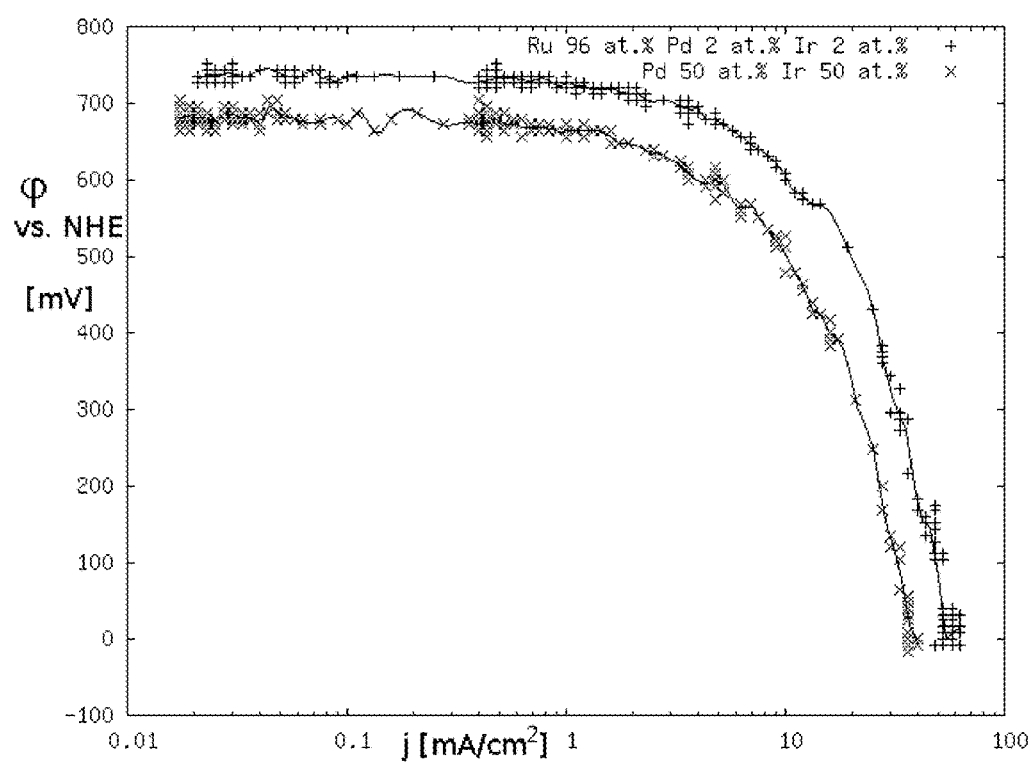
FIG. 6 shows a polarization curve for smooth bright films of the ruthenium alloy $Ru_{0.96}Pd_{0.02}Ir_{0.02}$ (96 at.-% ruthenium, 2 at.-% palladium, 2 at.-% iridium) on nickel sheets compared to bright films of a palladium-iridium alloy (50 at.-% Ir) on a nickel sheet as electrocatalyst for hydrogen peroxide cathodes according to a further embodiment of the present invention in a static solution of 3.2 M $H_2O_2$, 0.4 M $H_2SO_4$ at 20° C.

FIG. 6 shows a comparison of a polarization curve for a nickel sheet coated by a bright smooth layer of a ruthenium-palladium-iridium alloy (96 at.-% Ru, 2 at.-% Pd, 2 at.-% Ir) in an electrolyte of 2.32 M $H_2O_2$ in 0.4 M $H_2SO_4$ as cathode compared to a nickel sheet coated with a bright palladium-iridium alloy layer (50 at.-% iridium) that was preferred in most prior art publications about hydrogen peroxide fuel cell cathodes. It is evident that the ruthenium-palladium-iridium-alloy is a more efficient electrocatalyst for hydrogen peroxide cathodes. Ruthenium and ruthenium-based alloys are therefore preferred catalysts for fuel cells using hydrogen peroxide as oxidant as they are also generating much less oxygen by catalytic hydrogen peroxide decomposition (3) compared to palladium-iridium (50% at.-Pd) and have a better durability than thin palladium-iridium films that significantly lose electrocatalytical activity after a few minutes of use in 2.32 M $H_2O_2$ (see table 1).

Table 1 shows properties of ruthenium and palladium-iridium (50-at. % Ir) films on a nickel sheet in a solution that consisted of 2.32 M $H_2O_2$ for measurement of oxygen generated as by-product by catalytical hydrogen peroxide decomposition at 21° C. (measured volume converted to T=273 K, p=1013.25 hPa by calculation) and results of a test of durability of electrocatalytic activity in a catholyte that consisted of 2.32 M $H_2O_2$ and 0.4 M $H_2SO_4$. Ruthenium and ruthenium alloys generate only about 1/23 (respectively 1/19) of the amount of oxygen generated by hydrogen peroxide decomposition on palladium-iridium alloy films. Therefore ruthenium coated cathodes are preferred in catholytes of $c(H_2O_2) > 2$ mol/l.

TABLE 1

| electrocatalyst | Amount of generated oxygen by catalytical hydrogen peroxide decomposition [ml/(cm² s)] | Durability of electrocatalytical activity in 2.32M $H_2O_2$ and 0.4M $H_2SO_4$ |
|---|---|---|
| ruthenium | small (0.0068) | good |
| ruthenium-palladium (2 at.-% Pd, Ru balance) | small (0.0082) | good |
| ruthenium-palladium-iridium (2 at.-% Pd, 2 at.-% Ir, Ru balance) | small | good |
| palladium-iridium (50 at.-% Ir) | large (0.155) | poor |

The use of ruthenium as electrocatalyst for fuel cell cathodes using hydrogen peroxide as oxidant also reduces costs as the ruthenium price is considerably lower than the price of iridium and palladium which are preferred for prior art cathodes.

Ruthenium-based alloys are preferred as electrocatalysts for fuel cells employing concentrated hydrogen peroxide ($c(H_2O_2) > 1$ mol/l) as oxidant. Especially alloys $RuMe_I$ with palladium, iridium, platinum, and osmium have shown a decrease of polarization for current densities of 50-100 mA/cm² in concentrated solutions and are more preferred, alloys with rhenium deliver an increased open cell voltage and are also more preferred. It is surprising that palladium and iridium-additives start to be effective already at trace concentrations of about 10 ppm. This reduces the amount of expensive noble metals like iridium or palladium necessary for production of the electrocatalyst.

Preferred are palladium or iridium or rhenium contents between 0.1 and 50 at.-%. Since the open cell potential of the cathode decreases at palladium or iridium contents of over 20 at.-% palladium or iridium and in order to reduce costs contents while electrocatalytic activity rises between 10 ppm traces and 1 at.-%, contents between 1 at.-% and 10 at.-% are more preferred, contents between 1 at-% and 5 at.-% are most preferred. Moreover alloys with lower contents such as 2 at.-% palladium or iridium have a better adhesion on nickel substrates. Ruthenium alloys comprising platinum are less effective than Ru—Pd- or Ru—Ir-alloys and are more expensive than alloys comprising palladium. For ruthenium alloys comprising rhenium (RuRe) rhenium contents between 1 at.-% and 10 at.-% are also more preferred as alloys with large rhenium contents are probably not resistant against the catholyte.

Therefore, the resulting corresponding ruthenium-content of such a ternary alloy is $x(Ru)=100$ at.-%-$x(Me_I)$-$x(Me_{II})$ and an atomic ratio $x(Ru)$ between 60 at.-% and 99.99 at.-% is therefore preferred, a ruthenium content of 80 at.-% to 98 at.-% is more preferred and a ruthenium content $x(Ru)$ of 90 at.-% to 98 at.-% is most preferred for these ternary electrocatalysts. A ruthenium content of about 96 at.-% is optimum. This value $x(Ru)$ may include the atomic ratio of incidental constituents and impurities, too.

Ternary alloys of ruthenium $RuMe_I Me_{II}$ with a small amount of palladium (as $Me_I$) and iridium or rhenium (as $Me_{II}$) have even less polarization at current densities of 80-100 mA/cm². Therefore ternary alloys RuPdIr with 1-5 at.-% palladium, 1-5 at.-% iridium, ruthenium balance are most preferred. Iridium or palladium may be replaced by rhenium.

FIG. 6 shows a polarization curve for a film of the alloy ruthenium-palladium-iridium (96 at.-% Ru, 2 at.-% Pd, 2 at.-% Ir) on nickel compared to a film of palladium-iridium (50 at.-% Ir) on nickel. Ternary ruthenium alloys $RuMe_I Me_{II}$ with a small amount of rhenium (1-5 at.-%) such as Ru—Pd—Re and Ru—Ir—Re are most preferred, too. Quaternary alloys Ru—Pd—Ir—Re with 1 at.-%-5 at.-% rhenium deliver an advantageous more positive open cell potential and are optimum while other quaternary alloys $RuMe_I Me_I Me_{III}$ with $Me_{III} \neq Re$ offer little or no advantage.

A corresponding ruthenium-content of such a quaternary alloy is $x(Ru)=100$ at.-%-$x(Me_I)$-$x(Me_{II})$-$x(Me_{III})$ and an atomic ratio $x(Ru)$ between 85 at.-% and 97 at.-% is therefore most preferred for such quaternary electrocatalysts. This value $x(Ru)$ may also include the atomic ratio of incidental constituents and impurities in these alloys, too.

The above electrocatalysts can be deposited directly on a current collector like carbon paper (e.g. Toray TGP-H-060) or used as supported catalysts on carbon, activated carbon or other high surface area carbons like carbon blacks commonly sold under the trademark "VULCAN XC72R" or "VULCAN XC-200" by the Cabot Corporation, Boston, Mass. Carbon blacks usually require etching prior use in order to ensure wetting by electroless plating solutions. Etching may be done by nitric acid or other methods known for oxidizing carbon such as a mixture of nitric acid and sulfuric acid although other solutions comprising potassium permanganate (Hummers-Offeman process), and solutions for oxidation of graphite comprising potassium chlorate (Brodie or Staudenmaier process) may be also used, too. Alternatively carbon nanotubes, graphite nanotubes, doped polyaniline nanofibers or doped polyaniline nanotubes or other nanostructured materials can be used as support. Carbon nanotubes and graphite nanotubes are available from a large number of suppliers like Bayer MaterialScience AG, D-51368 Leverkusen, Germany. A catalyst loading of 5-50% ruthenium or ruthenium alloy is preferred, a loading of 5-30% is most preferred.

For production of quaternary electrocatalysts comprising rhenium galvanic deposition of ruthenium-rhenium alloys or thermal decomposition of ammonium hexachlororuthenate comprising ammonium hexachloropalladate, ammonium hexachloroiridate and ammonium perrhenate in hydrogen may be used.

As mentioned ruthenium and ruthenium-based alloys are superior electrocatalysts for fuel cell cathodes using concentrated hydrogen peroxide as oxidant. Such electrocatalyst layers may also deposited on inert substrates. Inert Substrates according to the present invention are resistant against the catholyte comprising the hydrogen peroxide oxidant such as carbon paper, carbon fiber fabric, activated carbon or carbon nanotubes bonded to a current collector. Nevertheless other materials such as conducting polymers like PANI or conducting polymer nanotubes may be used as substrate.

A ruthenium or ruthenium alloy electrocatalyst coating process according to the present invention comprises steps of pre-treating a provided substrate and coating the pre-treated substrate. The step of pre-treating comprises cleaning the substrate in hydrochloric acid and distilled water. In an embodiment of the invention the pre-treating step is further comprising deposition of a single atom layer of palladium atoms as a catalyst for electroless deposition of the electrocatalyst.

According to an embodiment of the present invention the ruthenium or ruthenium alloy electrocatalyst can be deposited by an electrodeposition process. A ruthenium plating bath that contains a ruthenium nitridochloro complex $K_3[Re^{IV}_2NCl_8(H_2O)_2]$ or a ruthenium nitrosyl complex is used to deposit ruthenium or ruthenium alloys. Preferred electroplating baths comprise a ruthenium nitridochloro complex. In a preferred embodiment the plating bath is further comprising sulfamic acid.

In a further embodiment of the present invention ruthenium or a ruthenium-based alloy can be deposited using an electroless plating bath on a support like activated carbon or high surface area carbon blacks or a substrate. An electroless plating bath comprising a ruthenium nitrosyl complex and a reducing agent such as dithionite and hydrazine or a ruthenium halide and an alkali borohydride can be used for this purpose. Pre-treating the substrate with a solution of palladium salt and a reducing agent such as tin(II)-chloride may be required for electroless plating of ruthenium and ruthenium alloys with the electroless plating baths comprising hydrazine on some substrates. Alternatively other reducing agents can be used.

Preferred electroless plating baths for production of electrocatalysts on a carbon black support comprise a ruthenium (III) chloride solution further comprising platinum metal halides. Sodium boranate solution is added dropwise at 5° C. to the plating bath.

Polyaniline (PANT) nanotubes or nanofibers can be electrodeposited on an inert electrode or produced by polymerization of aniline using a template or in a solution of a surfactant like 0.05 M sodium dodecyl sulfate in an acid such as 1 M hydrochloric acid or perchloric acid. For example 10 ml solution of sodium dodecylsulfate in 1 M HCl is ultrasonicated for 1 hour. Aniline is added up to a concentration of 0.2 M and 10 ml 0.125 M solution of ammonium peroxodisulfate is added slowly to the stirred aniline solution kept at 0-5° C. for 3 hours. The solution is filtered and rinsed several times with methanol and distilled water and dried and yields polyaniline nanotubes.

Polyaniline nanotubes can also be synthesized by interfacial polymerization at the interface of two phases or polymerization through a semipermeable membrane. In interfacial polymerization for example 0.3 ml aniline is dissolved in 10 ml chloroform. 0.18 g ammonium peroxodisulfate is dissolved in an aqueous solution of the acid used as dopant (e.g. 1 M perchloric acid). The organic phase is overlaid by the aqueous solution of ammonium peroxodisulfate. PANI nanotubes that form at the interface of the two phases and dissolve in the aqueous phase within 10 minutes at room temperature can be separated by filtration of the aqueous phase. Polypyrrole nanotubes, polythiophene nanotubes and poly(3,4-ethylenedioxythiophene) nanotubes can be produced in a similar way.

According to an embodiment of the current invention the catalyst is coated by thin ion-conducting ionomer layer copolymer of tetrafluoroethylene and a perfluorovinyl ether sulfonic acid commonly sold under the trademark "NAFION" by E.I. DuPont de Nemours and Company, Wilmington, Del. or "FUMION" commonly sold by Fuma-Tech GmbH, D-66386 St. Ingbert, Germany. This ionomer acts as ion-conductor layer that ensures ion-conducting contact of all catalyst particles to the electrochemical cell as well as transport of the oxidants hydrogen peroxide or oxygen and the product of the cathode reaction water. Besides the ionomer polymer layer protects the catalyst layer against abrasion and ensures wetting of the electrode by an electrolyte for hydrogen peroxide cathodes. Preferred is coating using a copolymer of tetrafluoroethylene and a perfluorovinyl ether sulfonic acid such as a 5% solution of "NAFION" (eq. wt. 1100 u) in a mixture of lower aliphatic alcohols and 15-20% water or "FUMION FLNA-905" dispersion (eq. wt.: 900 u, 5% dispersion in 45% water 50% n-propanol).

Electrodes for immersion in a liquid electrolyte according to main embodiment 1 comprising the above sequence of three layers (intrinsically electron-conducting adhesive layer, electrocatalyst layer, ionomer layer) instead of a single electrocatalyst layer produced from a catalyst ink are surprisingly superior to such conventional electrodes for hydrogen peroxide fuel cells.

A vacuum-high pressure process may be also used for this impregnation step in order to ensure full impregnation of small catalyst particles. Moreover additives such as tensides may be used as wetting agents in order to reduce surface tension of the ionomer solution during impregnation.

Figure 3A:
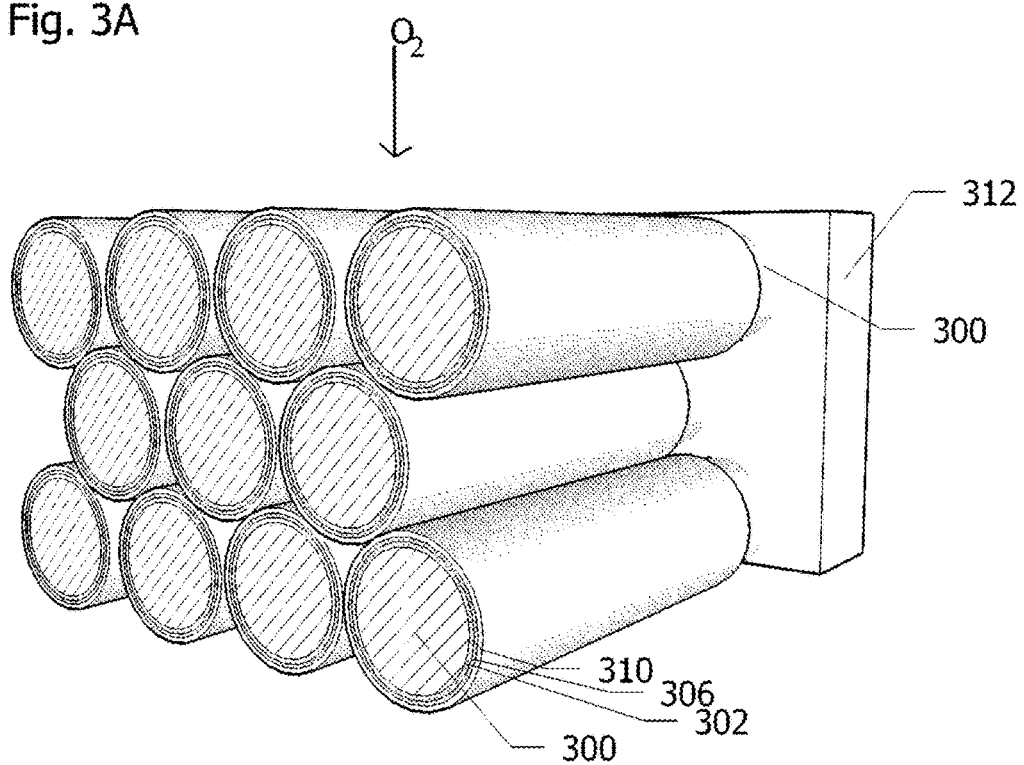
FIG. 3A shows a sectional view of an oxygen cathode as a further embodiment of the present invention.
Figure 3B:
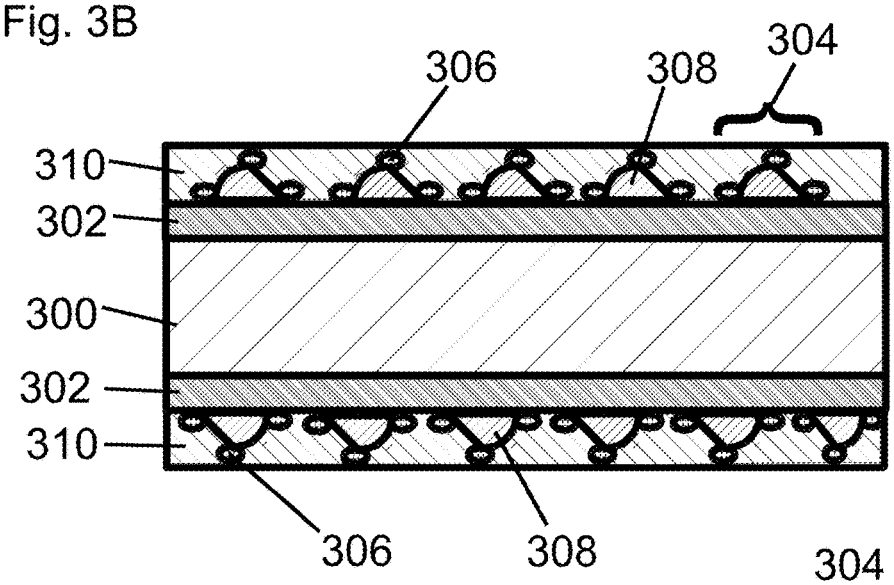
FIG. 3B shows a sectional view of a coated carbon fiber of the oxygen cathode shown in FIG. 3A.
Figure 3C:
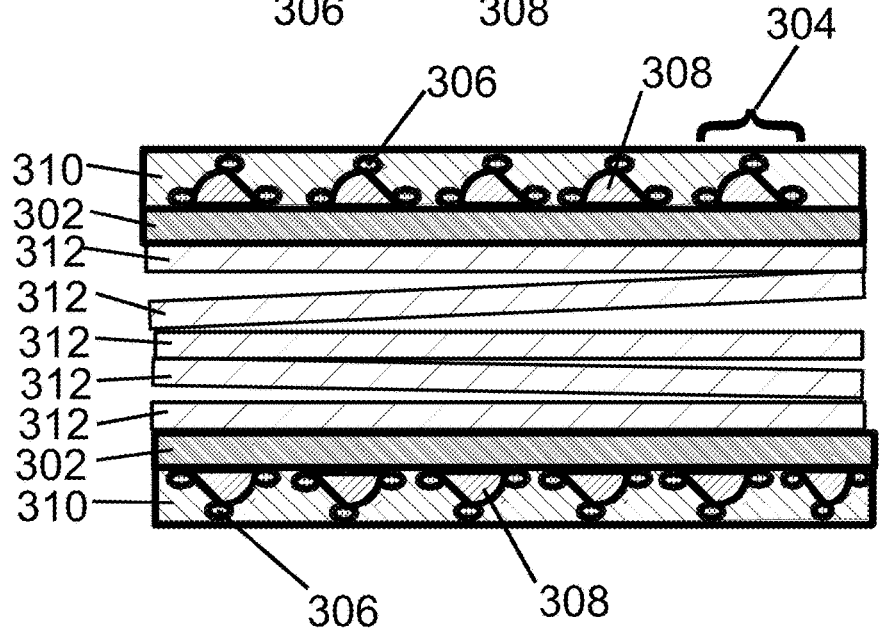
FIG. 3C shows a sectional view of a coated bundle of carbon fibers according to an alternative embodiment of the oxygen cathode.

According to another embodiment of the present invention the topology of oxygen cathodes shown in FIGS. 3A, 3B, 3C, 3D and 3E is adapted due to the requirements of contact of the three phases instead of two phases for hydrogen peroxide cathodes (for details see section main embodiment 2 below). FIG. 3A shows a cross section of an oxygen electrode according to an embodiment of the invention that consists of coated carbon fibers (300) as part of the current collector. The carbon fibers (300) of the oxygen cathode that are shown in FIG. 3B are coated by a catalyst layer on an intrisically conducting adhesive (302). The carbon fibres (300) are used as current collectors. Single fibers (300) can be coated as shown in FIG. 3B or bundles of carbon fibers (312) or woven carbon fibre fabric can be used as current collectors as shown in FIG. 3C.

Figure 3D:
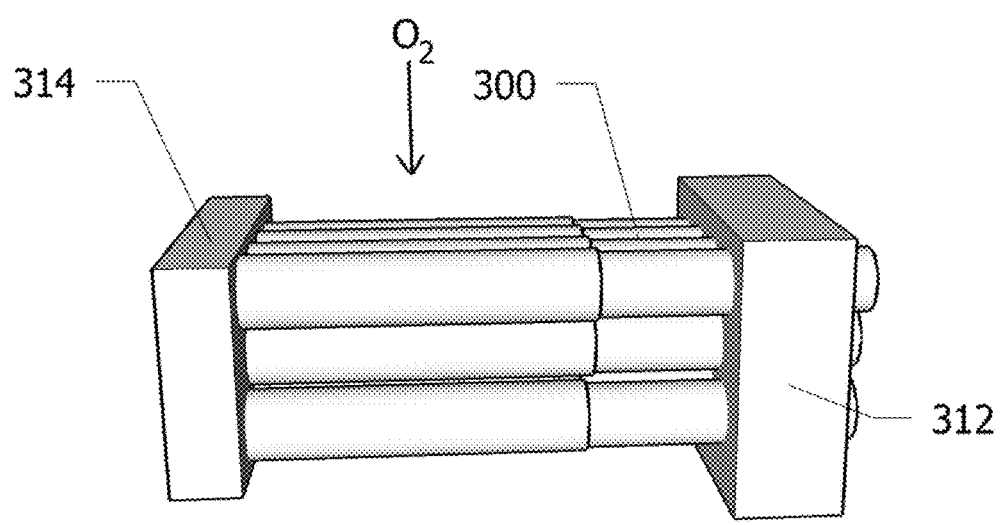
FIG. 3D shows an oxygen cathode of FIG. 3A comprising coated carbon fibers shown in FIG. 3C attached to a PEM membrane of a polymer electrolyte fuel cell.
Figure 3E:
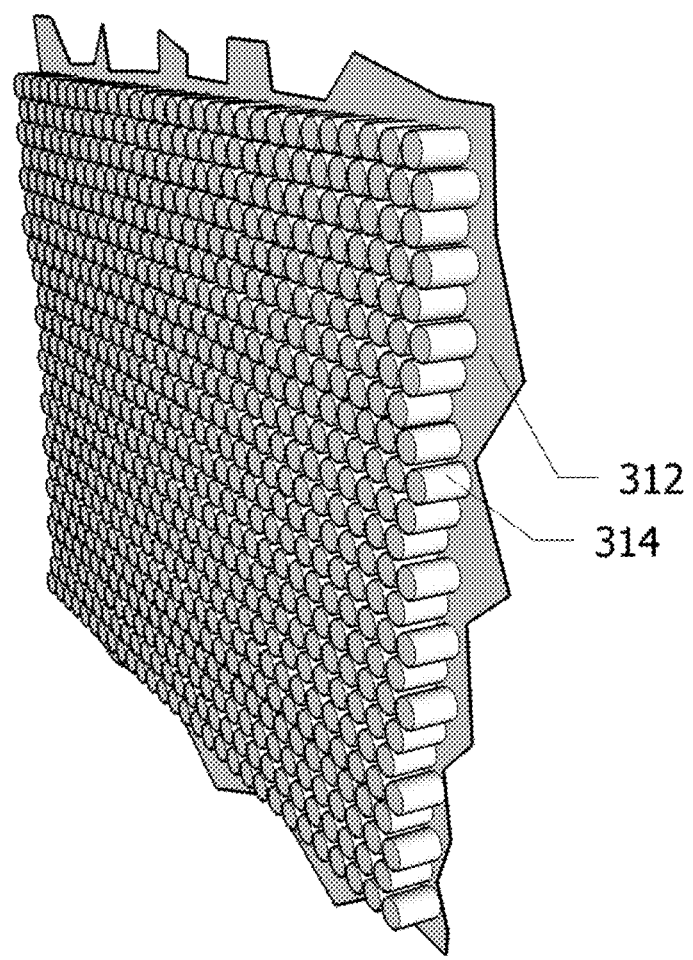
FIG. 3E shows a larger portion of a carbon fiber coated cathode of FIG. 3A.
Figure 4A:
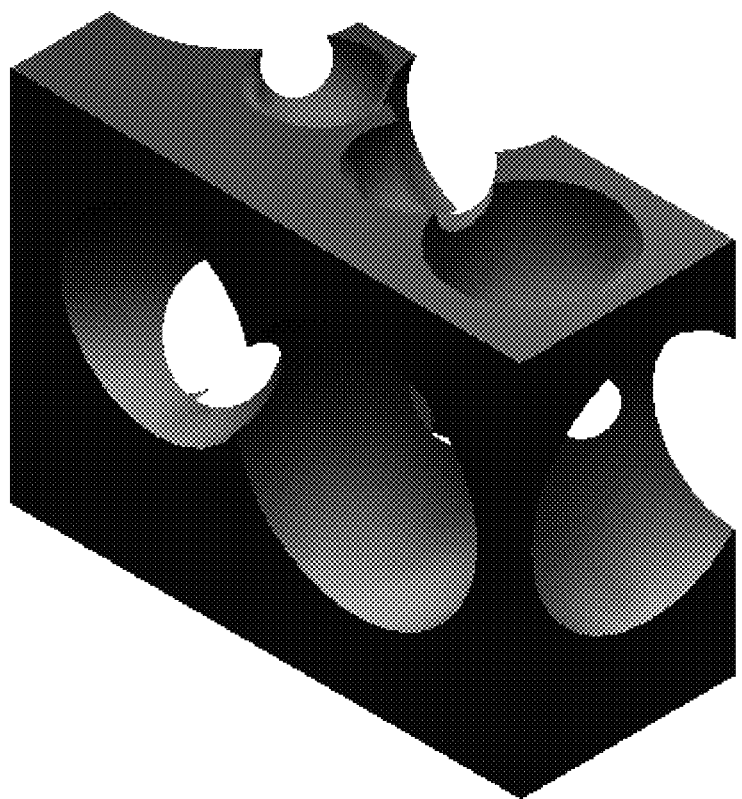
FIG. 4A shows a portion of an electrocatalyst-coated porous conducting body of an oxygen cathode according to a further embodiment of the present invention.
Figure 4B:
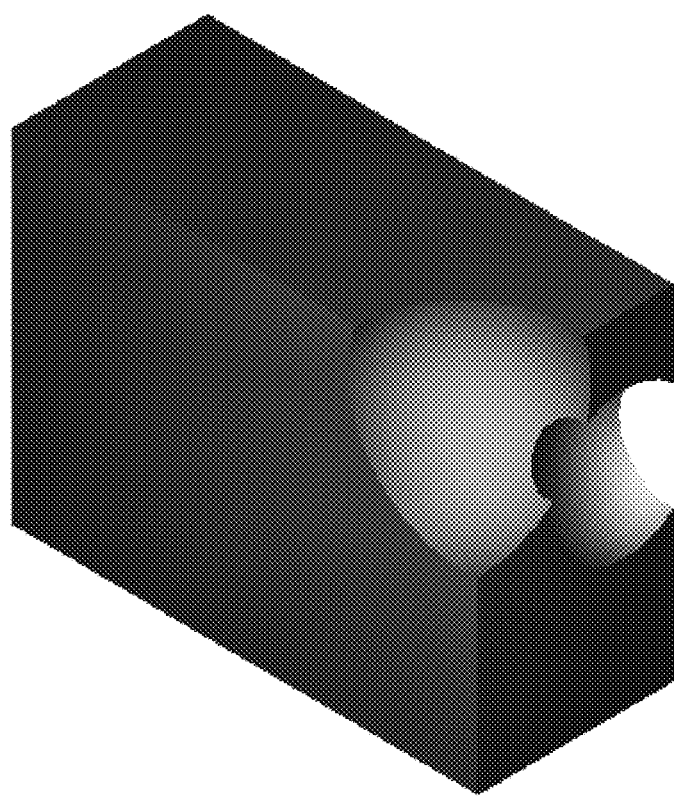
FIG. 4B shows two pores of an electrocatalyst-coated porous conducting body of an oxygen cathode of FIG. 4A.
Figure 4C:
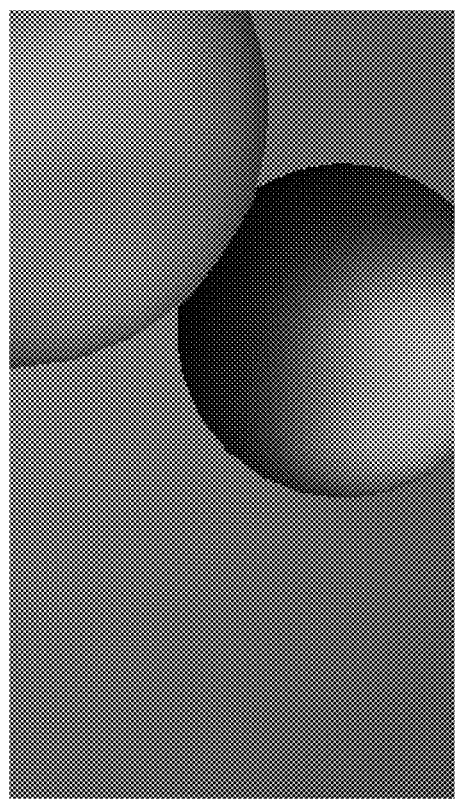
FIG. 4C shows a side view of the pores of FIG. 4B.
Figure 4D:
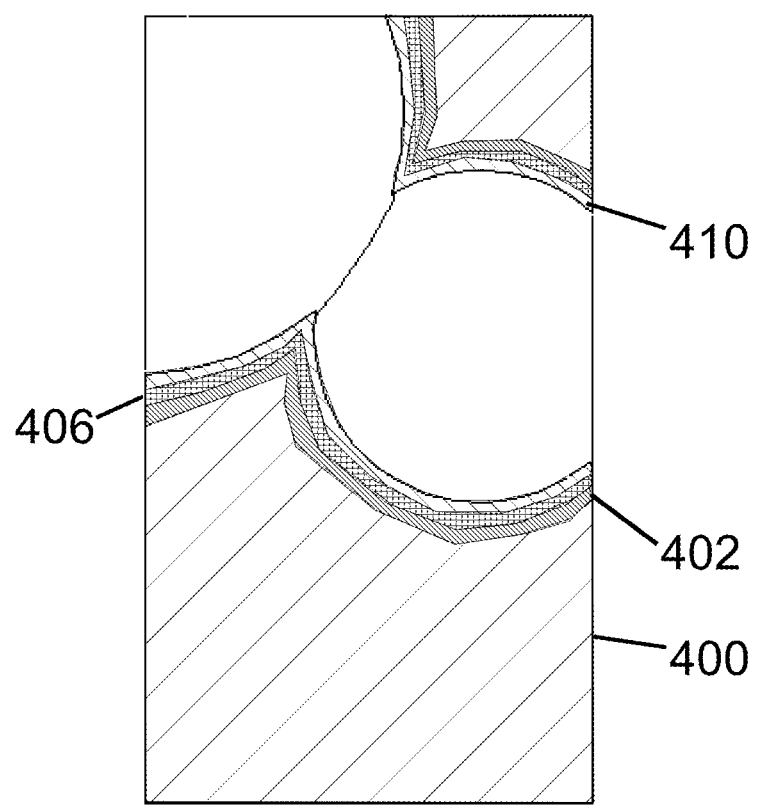
FIG. 4D shows a section through the pores of FIG. 4C.

FIG. 3D shows a side view of a carbon fiber electrode that can be used as oxygen cathode for fuel cells. The coated carbon fibers (300) are mounted on a current collector substrate (312) like a titanium current collector, carbon paper or conducting polymer-carbon fiber composite by means for attaching the carbon fibers to the substrate (312) such as bonding with a conducting adhesive, clamping the uncoated ends of the fibers in a holder on a metal substrate. The resulting cathodes can be bonded to a PEM-membrane (314) of a PEM fuel cell using a "NAFION"-coating as shown in FIG. 3D.

A cathode consisting of coated carbon fibers shown in FIG. 3B or FIG. 3C can be also used as hydrogen peroxide cathode of a hydrogen peroxide fuel cell or semi fuel cell.

As current collector material (300 in FIG. 3A-3C) other high surface area materials such as woven carbon fiber fabric, metal meshes, hollow carbon tubes, porous carbon such as carbon aerogel, and metal foams like titanium sponge may be used.

The current collector material (300) is coated by conducting adhesive (302), a catalyst layer (306) and an ionomer coating (310) as shown in FIG. 3A.

As catalysts supported catalysts like platinum, platinum alloys (306) or ruthenium on activated carbon (308) or unsupported catalysts can be used. For oxygen cathodes prior art platinum alloys may be used as preferred electrocatalysts.

According to a further embodiment of the present invention electrocatalysts for oxygen cathodes selected from the group consisting of platinum, ruthenium, osmium, rhenium, palladium, rhodium, iridium, chromium, cobalt, nickel, manganese, vanadium, silver, titanium, tungsten, aluminum, tin, silicon, molybdenum, bismuth, and alloys thereof are preferred.

The catalyst particles (304, 306) are bonded to the carbon fibers (300) by a conductive adhesive (302) comprising intrinsically electron conducting polymers.

The catalyst layer is coated by a thin ion-conducting ionomer layer (310) that ensures fast diffusion of oxygen that comprises a fluorinated ionomer such as "NAFION" or "FUMION". "NAFION" can be also used to bond the fibers to a PEM membrane (314) of a fuel cell as an ion-conducting adhesive bridge as shown in FIG. 3D. The "NAFION" bridge can consist essentially of porous "NAFION" foam produced by suitable additives to the "NAFION" adhesive that produce gas during drying or heating such as azodicarbonamide, fluorinated hydrocarbons or carbon dioxide generating compositions comprising an acidic component and a alkali or earth alkali carbonate or alkali hydrogen carbonate. The pores of the "NAFION" foam improve diffusion of oxygen.

The topology of this oxygen cathode according to the present invention ensures fast diffusion of oxygen and good ionic conductivity as well as electrical conductivity.

Instead of coated carbon fibers hollow conducting tubes could be used for an oxygen electrode according to an embodiment of the present invention. The coating of the tubes with electrocatalyst may be bonded to the interior of the hollow conducting tubes. This could be accomplished by immersion of the tubes in a low viscosity electron conducting adhesive and coating the interior of the tubes with a fine catalyst powder by blowing with compressed air. After drying the tubes the electrocatalyst layer may be coated with a thin layer of an ion conducting ionomer layer such as "NAFION".

Alternatively the hollow conducting tubes can be coated on the interior and exterior surface in order to increase the area of the electrode. A woven carbon fiber fabric may be coated in a similar way.

According to another embodiment of the present invention shown in FIG. 4A-FIG. 4D a porous current collector (400) like Titanium sponge can be coated in a similar way for use as an oxygen electrode. The substrate can be coated with conducting adhesive (402) by immersion, the electrocatalyst layer (406) can be applied by blowing catalyst powder on the adhesive using compressed gas. Coating with a ionomer layer like "NAFION" (410) can be performed by immersion, again. The topology of this design offers improved electrical conductivity of the adhesive that bonds the catalyst as well as fast diffusion of oxygen and hydronium ions ($H_3O^+$).

The preferred intrinsically electron-conducting adhesive according to an embodiment of the present invention comprises an intrinsically electron-conducting polymer such as polyanilines, polypyrroles, polythiophenes, polyparaphenylenes, polyazulenes, polyfuranes, polyindoles, polypyridines, polypyrazines, polytriazines, polythiazoles, polyimidazoles, polyquinolines, polybenzimidazoles, polytriazoles, polyoxydiazoles, polythianaphthenes, polycarbazoles, polybenzothiophenes, polybenzofuranes, polyheptadiyne, and polyparaphenylene vinylene and their substituted derivatives, copolymers, copolymers with alkenes or acrylates, and mixtures thereof. Polyaniline and PEDOT-PSS are more preferred. The preferred adhesive is further comprising a fluoropolymer ionomer as dopant and ion-conductor such as a copolymer of tetrafluoroethylene and a perfluorovinyl ether sulfonic acid commonly sold under the trademark "NAFION" by E.I. DuPont de Nemours and Company, Wilmington, Del., and a solvent such as dimethyl sulfoxide, N-methyl pyrrolidinone, dimethyl formamide, alcohols, water or a combination thereof.

Intrinsically electron conducting pressure sensitive adhesives (PSA) are more preferred as intrinsically electron-conducting adhesives because they are solvent-free adhesives that bond the electrocatalyst particles and connect them electrically to the current collector without wetting the electrochemically active upper side of the electrocatalyst particles. Preferred PSA-adhesives comprise a solution of polyaniline-dodecylbenzene sulfonic acid complex (PANI-DBSA), polystyrene-block-(polyethylene-ran-polybutylene)-block-polystyrene (SEBS) and a sufficient amount of poly-α-pinene as tackifier in p-xylene although other PANI-complexes like PANI-CSA, other polymers like polystyrene-block-polyisoprene-block-polystyrene or polystyrene-block-polybutadiene-block-polystyrene (SBS), or other tackifiers like rosin and rosin esters, polylimonene or tackifiers obtainable via condensation of MQ silicones with silicones may be used, too. PSA adhesives can be easily applied for example by screen printing. This simplifies the manufacturing process of cathodes of the present invention.

Preferred fluoropolymer ionomer for adhesives comprising an ionomer is "NAFION" with an eq. wt. of 1100 u, preferred solvent is a mixture of dimethyl sulfoxide, alcohols and water. According to an embodiment of the present invention the adhesive can be further comprising graphite (for oxygen cathodes copper or silver may be used) and a further dopant such as dodecylbenzene sulfonic acid, camphor sulfonic acid or p-toluene sulfonic acid. Preferred additive is graphite powder.

Cathodes of one of the previously described topologies using an intrinsically electron conducting adhesive in order to bond an electrocatalyst may be also employed for other fuel cell cathodes such as nitric acid cathodes, nitrous oxide ($N_2O$) cathodes, chlorate cathodes, chlorine cathodes or bromine cathodes. Furthermore the principle may be also applied to fuel cell anodes by using a reductively doped conducting polymer such as polyparaphenylene (PPP) or polythiophenes as intrinsically conducting adhesive for bonding of the anode electrocatalyst.

Figure 5:
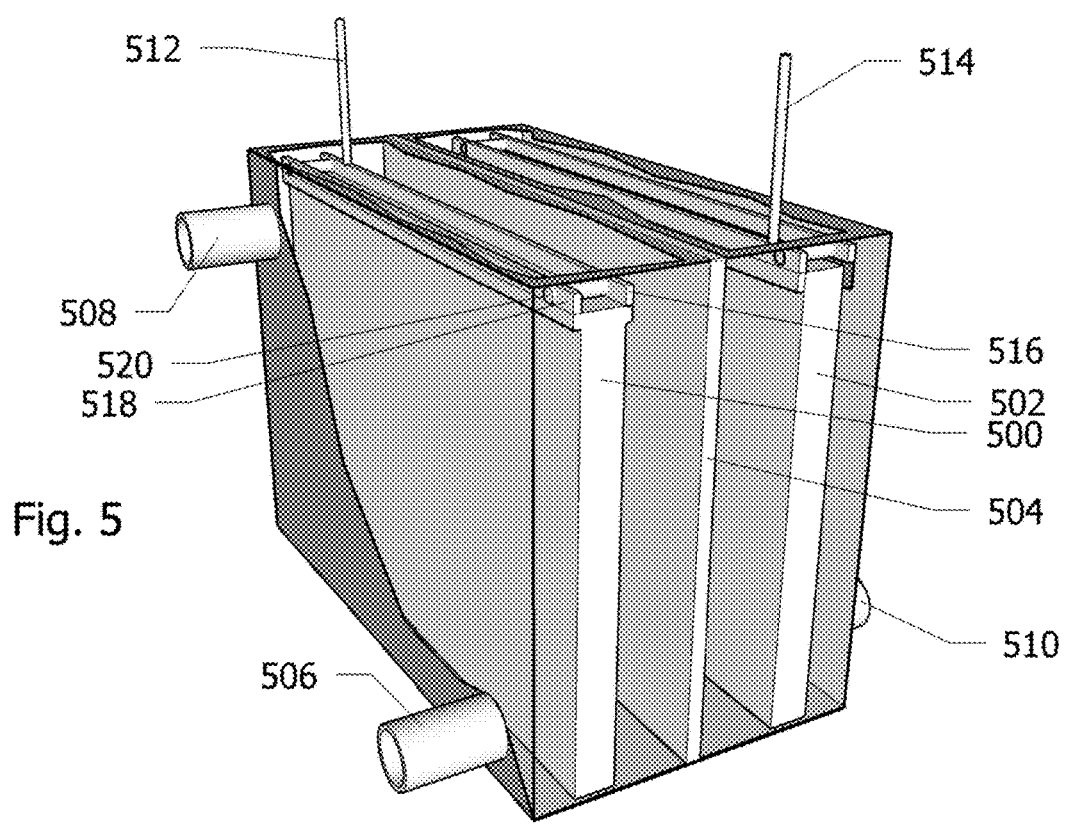
FIG. 5 shows a fuel cell according to an embodiment of the present invention.

According to another embodiment of the present invention the previously described hydrogen peroxide cathodes or oxygen cathodes can be employed in a fuel cell using magnesium anodes, aluminium anodes or zinc anodes (502) as shown in FIG. 5.

Alternatively borohydride anodes, methanol anodes, formate anodes or formaldehyde anodes (502) can be used. For borohydride anodes an electrocatalyst like a platinum group metal like palladium on carbon (such as "Vulcan XC72R") may be used while for anodes using organic fuels a platinum-ruthenium or ruthenium decorated platinum electrocatalyst can be employed although other electrocatalysts might be also suitable.

Figure 11:
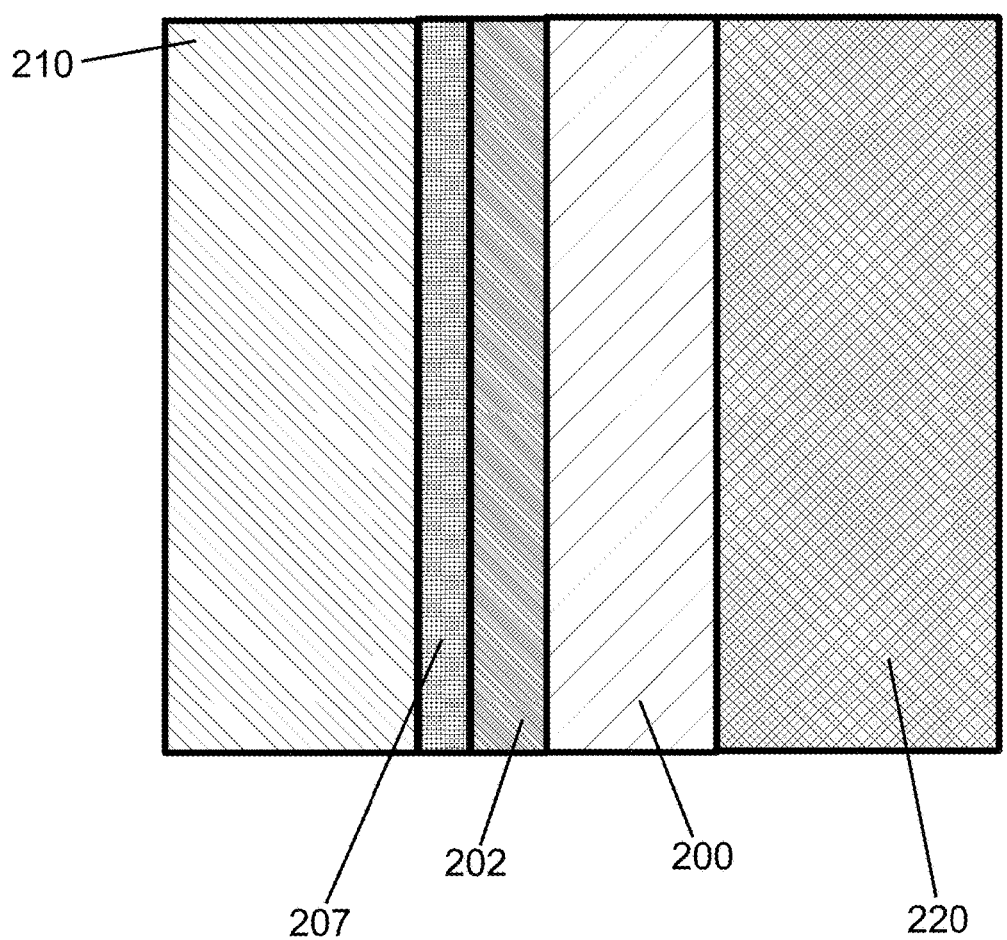
FIG. 11 shows a sectional view of a bipolar electrode comprising a cathode according to the present invention and an anode.

For fuel cells using hydrogen peroxide cathodes (500) as shown in FIG. 5 the catholyte is separated from the anolyte of each cell by a polymer electrolyte membrane (PEM) (504). Catholyte and oxidizer is supplied by pipes (506, 508), anolyte and fuel by tubes (510). Cathodes (500) according to the present invention are mounted in an electrode holder consisting of two metal sheets (516, 518) and screws (520). A metal bar (512, 514) provides electrical contact to the electrodes of each cell. Titanium is preferred material for this holder and screws for the cathode and the metal bar. The electrodes can be arranged as bipolar electrodes as shown in FIG. 11 comprising a cathode (with a conductive substrate (200), an intrinsically electron-conducting adhesive layer (202), a catalyst layer (207) and an ionomer layer (210)) and an anode (220).

According to a further embodiment of the invention hydrogen anodes (502) can be combined with hydrogen peroxide cathodes according to the present invention as shown in FIG. 5. For such hydrogen anodes palladium or platinum on carbon (such as "Vulcan XC72R") can be used as electrocatalysts.

The catholyte according to the present invention further comprises an acid such as sulfuric acid, perchloric acid, an alkali hydrogen sulfate, ammonium hydrogen sulfate, sulfonic acids or carboxylic acids such as acetic acid because the electrochemical potential of hydrogen peroxide in acidic solutions is considerable larger this increases the open cell voltage of the fuel cell.

For oxygen cathodes in an aqueous catholyte perchloric acid is preferred because adsorption of sulfate ions reduces the activity of the electrocatalyst by adsorption.

For hydrogen peroxide cathodes acids are preferred that form peroxy acids with hydrogen peroxide. For example sulfuric acid instantaneosly reacts with hydrogen peroxide to small amounts of Caro's Acid $H_2SO_5$ according to $H_2SO_4 + H_2O_2 \rightarrow H_2SO_5 + H_2O$. Although the equilibrium constant of this reaction is small (K=3.125) the small amount of $H_2SO_5$ of the order of 10 mM/l formed strongly influences the polarization of the cathode as can be shown in a comparison with a catholyte comprising only perchloric acid in FIG. 9. When sulfuric acid is added the polarization of the cathode at high current densities is reduced compared to an electrolyte without sulfuric acid. A similar effect can be observed with acetic acid by formation of peracetic acid. For platinum electrocatalysts the open cell voltage is also increased in presence of Caro's acid.

A concentration of $c(H_2SO_4)$ of $\geq 0.5$ mole/l and a concentration of $c(H_2O_2) \geq 1$ mole/l in the catholyte are preferred, a concentration of $c(H_2O_2) \geq 2.3$ M and $c(H_2SO_4) \geq 0.5$ mole/l is more preferred in order to produce a sufficient concentration of Caro's acid ($H_2SO_5$) in the catholyte. In this way polarization of hydrogen peroxide cathodes at high current densities is reduced by choice of the acid and concentration of acid and hydrogen peroxide.

Sulfuric acid, alkali hydrogen sulfates and carboxylic acids such as acetic acid, malonic acid, benzoic acid or phthalic acid are also preferred acids because the anions of those acids are not strongly adsorbed by the catalyst surface and do not hinder electrocatalytic activity. Moreover these acids form percarboxylic acids. Sulfuric acid or acetic acid are more preferred.

In dry state "NAFION" has a low proton conductivity. Therefore hydrogen peroxide fuel cells using a PEM membrane have to be stored filled with aqueous solutions. Alternatively hydrogen peroxide fuel cells that employ polymer electrolyte membranes (PEM membranes) for separation of catholyte and anolyte can be stored in dry state without electrolyte if the polymer electrolyte membranes are wetted by a solution comprising an ionic liquid in order to increase the conductivity of the PEM membrane after storage. Because of the very low vapor pressure the ionic liquid is confined in the membrane. In an embodiment of the invention the solution is further comprising water in order to increase conductivity. 1-ethyl-3-methylimidazolium nitrate or 1-ethyl-3-methylimidazolium chloride can be used as water-miscible ionic liquid for wetting the PEM membranes during storage. Other ionic liquids such as 1-butyl 3-methyl imidazolium trifluoromethane sulfonate, 1-methyl-3-octyl-imidazolium trifluoromethanesulfonate, tetraalkylammonium nitrate or choline chloride-urea or ammonium nitrate-urea-acetamide might be also suitable for wetting of PEM membranes during storage.

Figure 12:
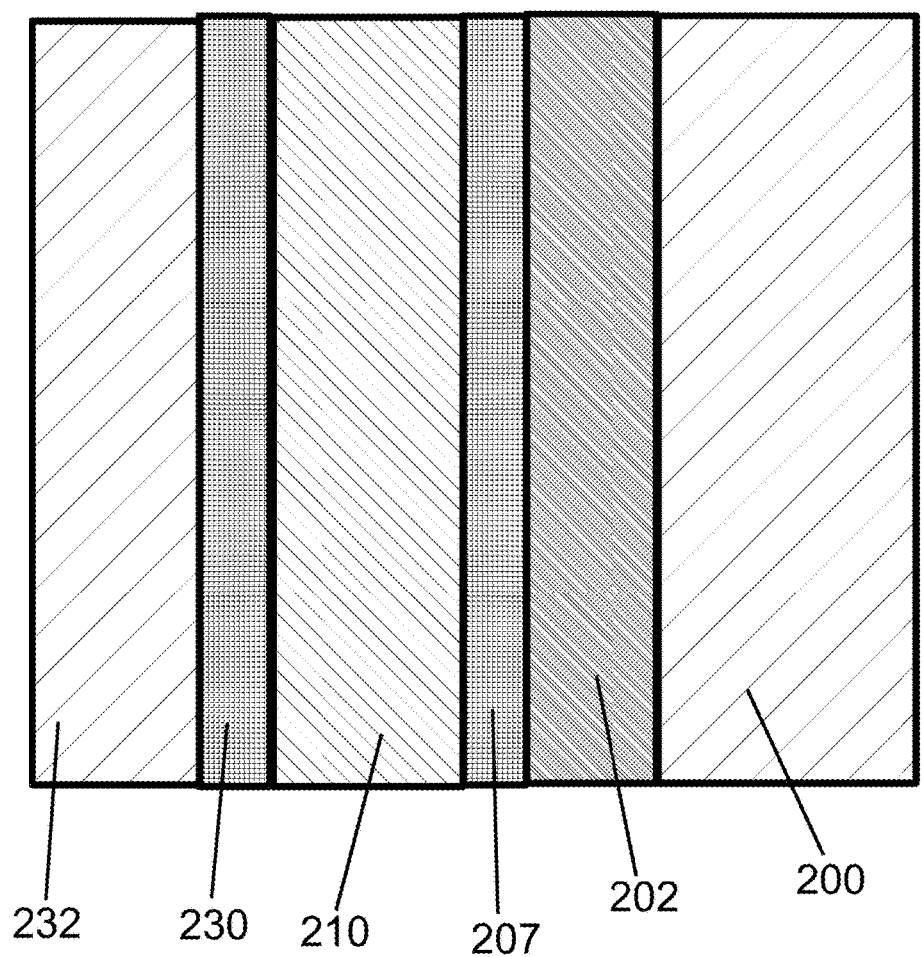
FIG. 12 shows a sectional view of a membrane electrode assembly comprising a cathode according to main embodiment 2 of the present invention, a polymerelectrolyte membrane and an anode.

Main Embodiment 2—PEM-Fuel Cell Membrane Electrode Assemblies Comprising Intrinsically Electron Conducting Adhesives Fuel cells using an oxygen cathode (300) according to an embodiment of the present invention have a membrane electrode assembly (MEA) as shown in FIG. 3D for PEM hydrogen-oxygen fuel cells. A PEM membrane (314) is used as electrolyte while the hydrogen anode is mounted on the other side of the PEM membrane. Hydrogen is fed through a diffusion layer to the anode coated with an electrocatalyst. Instead of the version of the invention of FIG. 3D a usual membrane electrode assembly (MEA) can comprise a cathode according to the present invention (comprising a gas diffusion layer as conductive substrate (200), an intrinsically electron-conducting adhesive (202), and an electrocatalyst layer (207)), a PEM-membrane (210) that may also include an additional ionomer layer of the cathode, an anodic electrocatalyst layer (230) and an anodic gas diffusion layer (232) as shown in FIG. 12 that is produced by hot pressing or laminating a catalyst coated substrate according to the present invention that is shown in FIG. 2A to an ionomer membrane.

Figure 13:
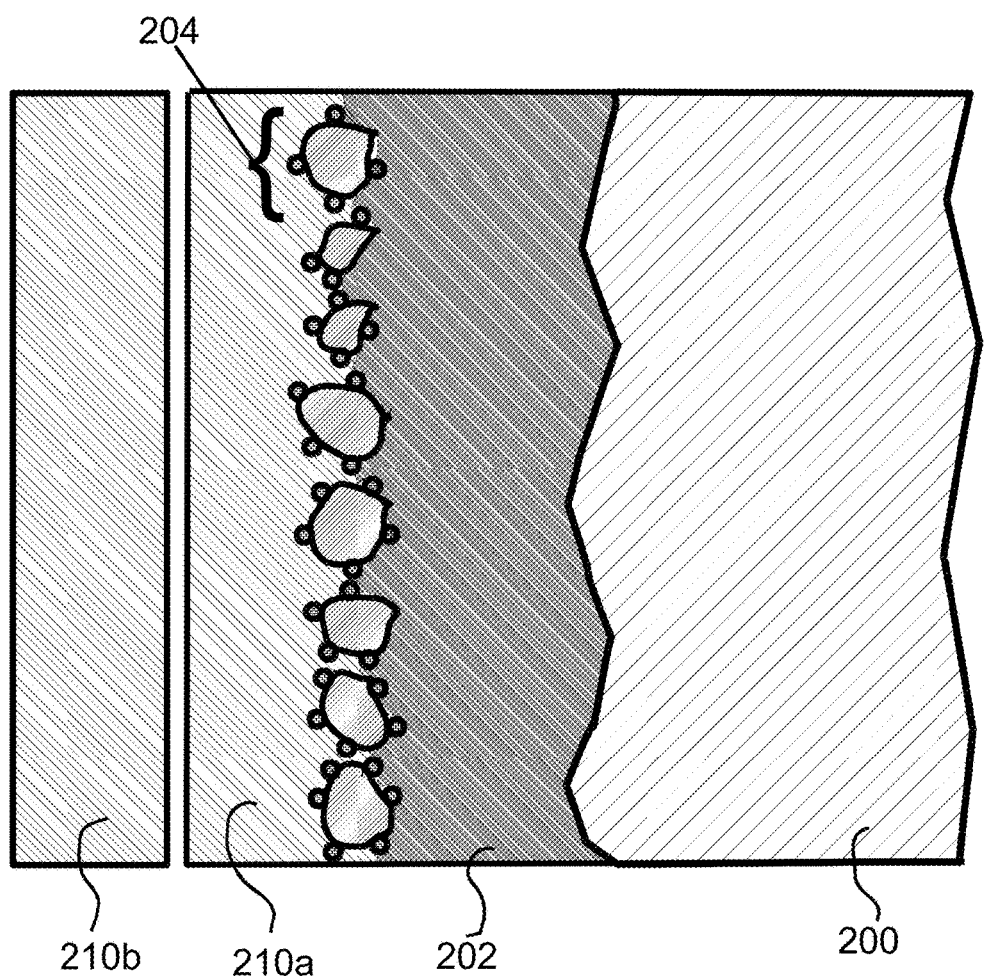
FIG. 13 shows a sectional view of a portion of components for production of a membrane electrode assembly comprising a catalyst coated substrate according to main embodiment 2 of the present invention, and a polymerelectrolyte membrane.

Such membrane electrode assemblies (MEAs) comprising a catalyst coated substrate comprising the above three layers (a layer of an intrinsically electron-conducting adhesive such as an intrinsically electron-conducting pressure sensitive adhesive, an electrocatalyst layer and an ionomer layer) according to main embodiment 2 of the present invention can be produced by conventional methods such as hot pressing or laminating a catalyst coated substrate (CCS) comprising a conducting substrate (200), an intrinsically electron-conducting adhesive layer (202) according to the present invention, an electrocatalyst layer (204) and an ionomer layer (210a) as shown in FIG. 13 to an ionomer membrane (210b in FIG. 13), such as membranes commonly sold by E.I. Du Pont de Nemours and Company, Wilmington, Del. under the trademark "NAFION") of a thickness between 30 µm and 254 µm although membranes of a smaller or larger thickness might be suitable, too. Such membranes may comprise PTFE fibres in order to minimize deformation during the change of water content. Such cathodes may be used for oxygen cathodes, air cathodes or any other type of PEM cathode. The resulting MEAs show superior properties. For anodes a conventional catalyst coated substrate manufactured from a catalyst ink comprising an ionomer might be preferable.

A catalyst coated substrate according to the present invention may comprise a microporous layer in order to optimize distribution of oxygen or air within the electrode of a membrane electrode assembly.

Fuel cells using an oxygen cathode according to an embodiment of the present invention and a borohydride anode, a methanol anode, a formaldehyde anode or a formate anode can use a fuel cell assembly shown in FIG. 3D, too. The anode is coated by an electrocatalyst like ruthenium-decorated platinum for methanol or other organic fuels or palladium for borohydride. The anode is wetted by an anolyte that contains the corresponding fuel. A PEM membrane (314) separates the cathode and the anolyte. For a fuel cell using an active metal anode such as a magnesium anode, an aluminium anode or a zinc anode the electrocatalytic anode is replaced by the active metal anode in a suitable anolyte.

Main Embodiment 2 V—Hot Pressing of a Membrane Electrode Assembly in a Vacuum

Figure 14:
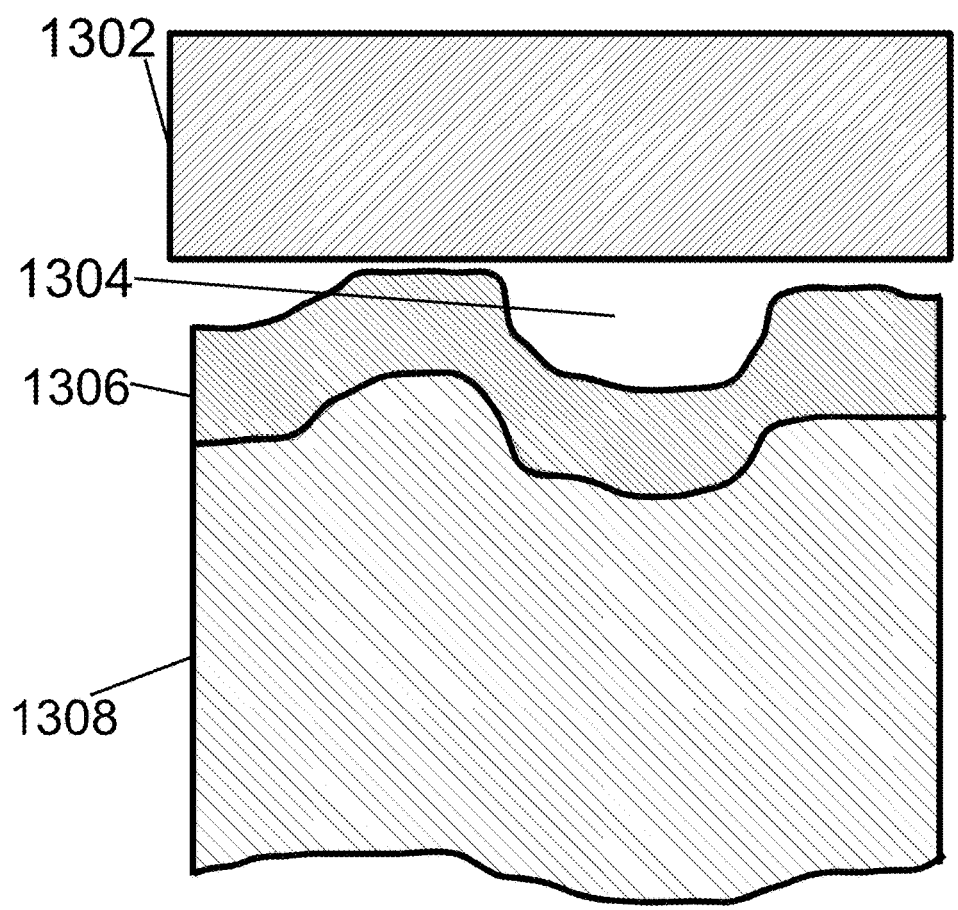
FIG. 14 shows a sectional view of a portion of components of a membrane electrode assembly of a prior-art manufacturing process just before hot pressing or laminating, an ionomer membrane and a catalyst coated substrate.

The process for production of such MEAs by the process of hot pressing "catalyst coated substrates" is widely known in the art (see for example Jiujun Zhang, Editor, "PEM Fuel Cell Electrocatalysts and Catalyst Layers—Fundamentals and Applications", Springer, New York 2008, pp. 371, 892-897, 911 and 1030. A sectional view of the MEA components before hot pressing is depicted in FIG. 14, that shows the ionomer membrane (1302) for the MEA, the catalyst layer (1306) of a catalyst coated substrate (1308) and the air gap between these ionomer layers (1304).

According to the literature the conventional process for hot pressing of membrane electrode assemblies is described as mature (cf. Supramaniam Srinivasan, "Fuel Cells—From Fundamentals to Applications", Springer, 2005, page 288). However an analysis of membrane electrode assemblies manufactured by such a prior art process showed the unexpected result that membrane electrode assemblies manufactured by the process of hot pressing catalyst coated substrates on an ionomer membrane comprise inclusions of air at the interface ionomer-membrane/electrocatalyst layer. These inclusions of insulating air on a considerable area of the electrode increases the impedance of this interface layer by the reduction of the cross sectional area of the ionic conductor. Apparently a possible reason for the inferior performance of membrane electrode assemblies manufactured by the method of hot pressing of catalyst coated substrates with ionomer membranes is air (1404) that is trapped between the ionomer membrane (1402) and the electrocatalyst layer (1406) of the catalyst coated substrate on a electron-conducting substrate such as a gas diffusion medium or fluid distribution layer (1400, see FIG. 15).

Figure 15:
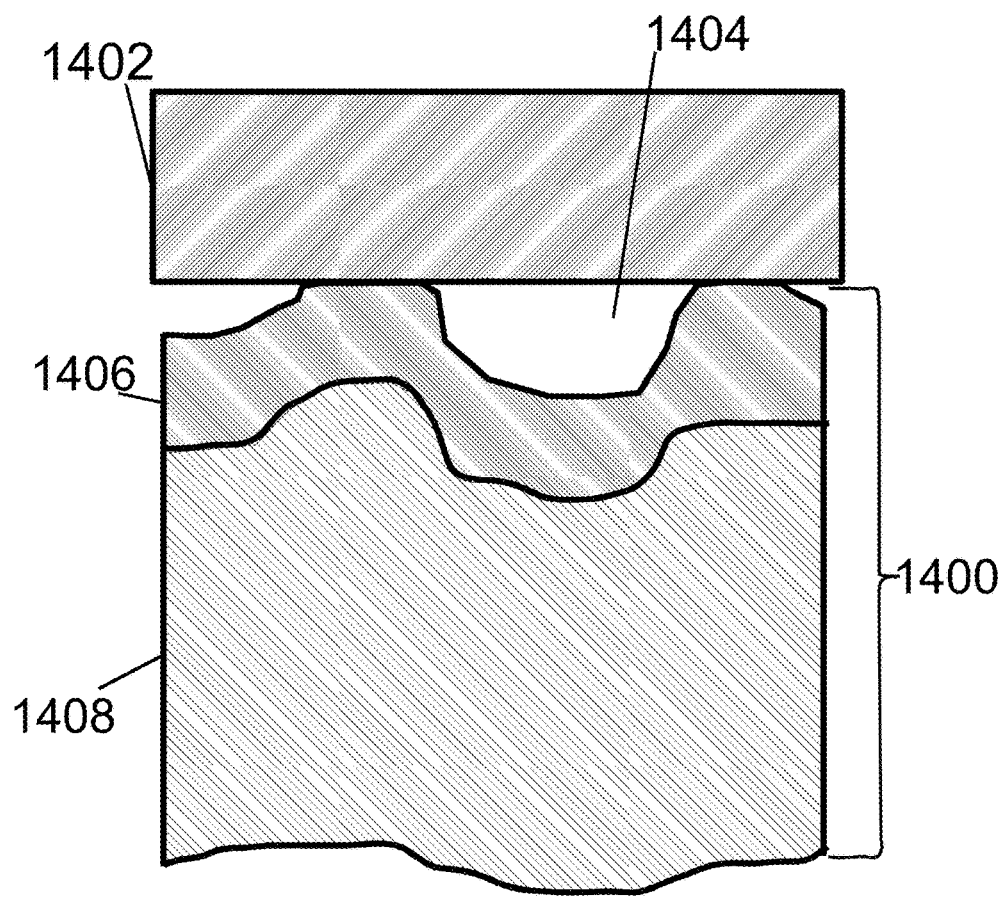
FIG. 15 shows a sectional view of components of a membrane electrode assembly manufactured by the prior art process of hot pressing a catalyst coated substrate and an ionomer membrane.

As shown in FIG. 15 the conventional process for the production of membrane electrode assemblies (MEAs) via the method of hot pressing catalyst coated substrates (1400) to an ionomer membrane (1402) yields membrane electrode assemblies with inclusions of air (1404) between the ionomer membrane (1402) and electrocatalyst layer (1406). This unexpected problem was discovered in an analysis of MEAs manufactured by the prior art process of catalyst coated substrates (CCS). The reason for this problem is the fact that in the conventional process of hot pressing as shown in FIG. 14 hot pressing is done in air under atmospheric pressure. However the electrocatalyst layer is not flat due to the uneven structure of usual gas diffusion layers (1308) such as carbon paper or carbon fibre fabric. So the trapped air (1304) between parts of the uneven electrocatalyst layer (1306) and the membrane (1302) cannot escape because of the impermeability of the ionomer membrane and binder of the electrocatalyst layer (typically ionomers such as fluoropolymers commonly sold under the trademark "NAFION" by E.I. DuPont and Company, Wilmington, Del.) for gases. Besides the impermeability of the die of the hot press that consist of solid metal also inhibits an escape of air even for porous electrocatalyst layers manufactured by the use of pore-forming additives.

These inclusions of air increase the impedance of the membrane/electrocatalyst layer-interface because the trapped air is an insulator. This increased impedance reduces the performance of membrane electrode assemblies manufactured according to the method of catalyst coated substrates. This might be a reason for the well-known but still unexplained superiority of the performance of MEAs manufactured by the method of catalyst coated membranes (CCM).

Figure 20:
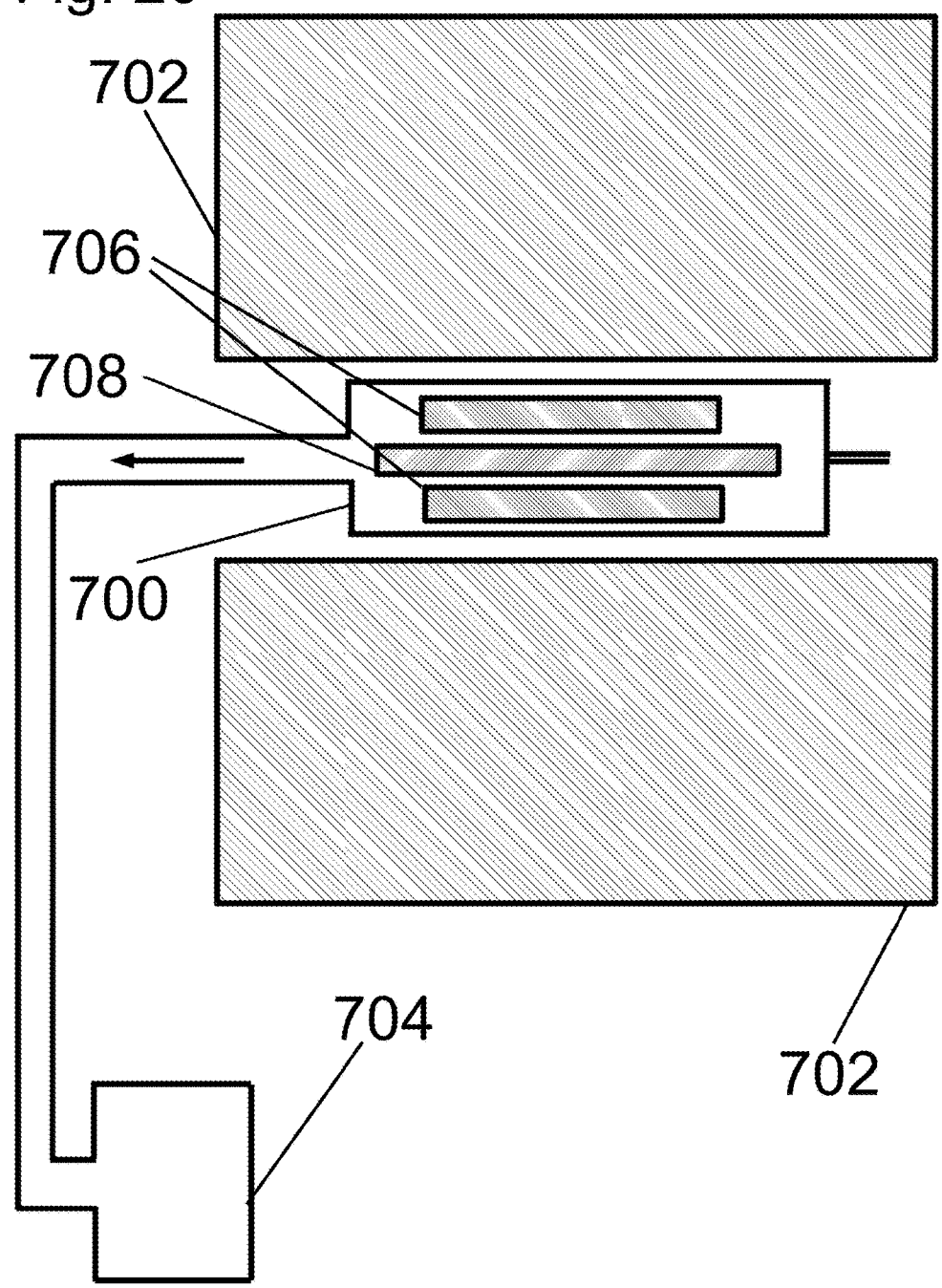
FIG. 20 shows a setup for performing a process step for the manufacture of a MEA by hot pressing a catalyst coated substrate on an ionomer membrane in a vacuum using a conventional hot press according to an embodiment of the present invention.

According to an embodiment of the invention this disadvantage is avoided by performing the step of hot pressing or laminating in a vacuum. In an embodiment of the invention the step of hot pressing in a vacuum as shown in FIG. 20 can be performed in a bag (700) consisting of a heat resistant polymer such as a polyimide commonly sold under the trademark "KAPTON" by E.I. DuPont de Nemours and Company, Wilmington, Del. using a conventional hot press (702). The step of hot pressing of an ionomer membrane (708) and catalyst coated substrates (706) in such a bag can be also performed by using a heated commercial autoclave filled with with an inert liquid such as oil. This step of laminating a MEA in such a polyimid bag can be also performed in a conventional laminator for roll bonding.

Figure 16:
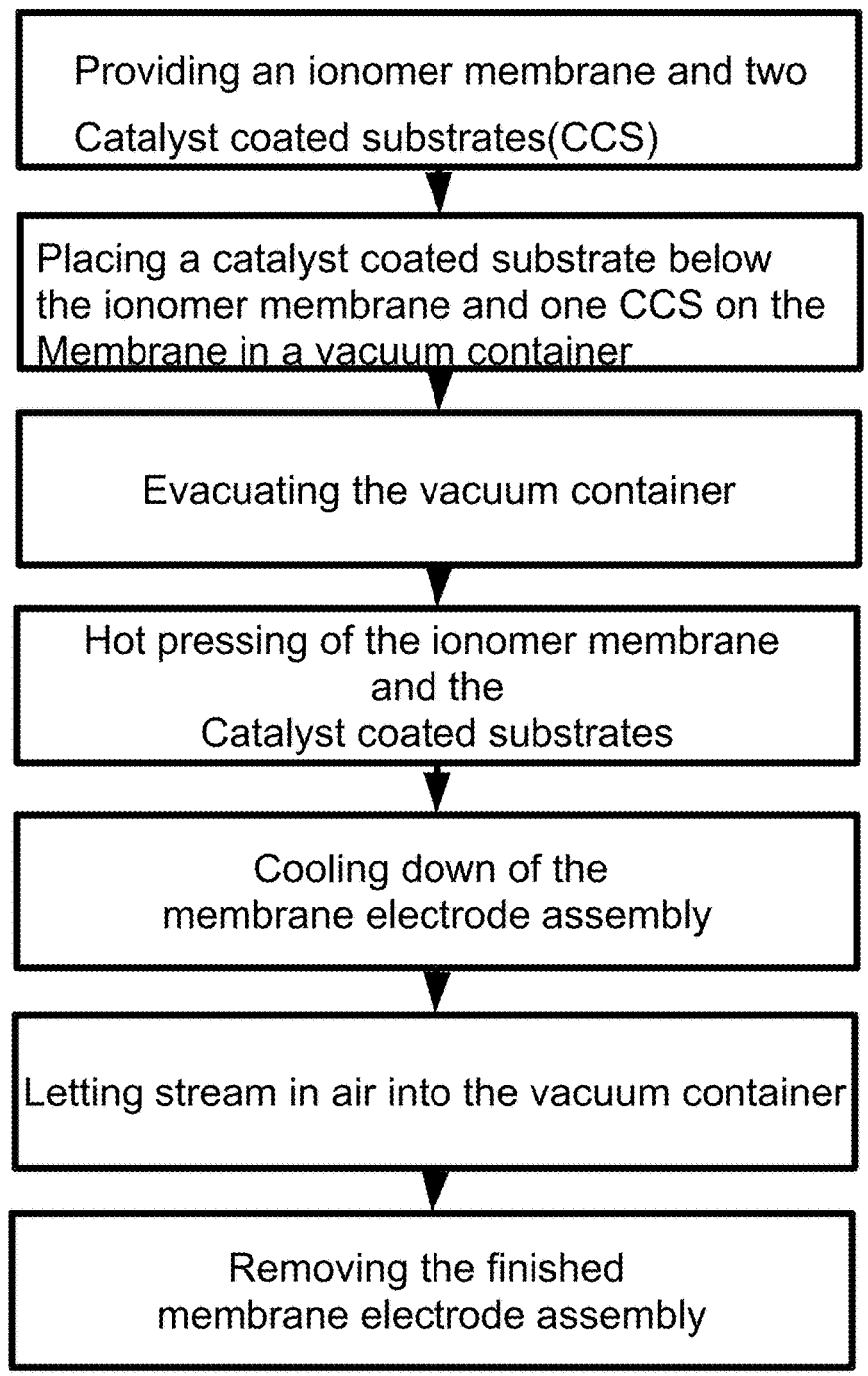
FIG. 16 shows the process steps for the manufacture of a MEA by hot pressing of a catalyst coated substrate and an ionomer membrane in a vacuum according to the present invention.
Figure 17:
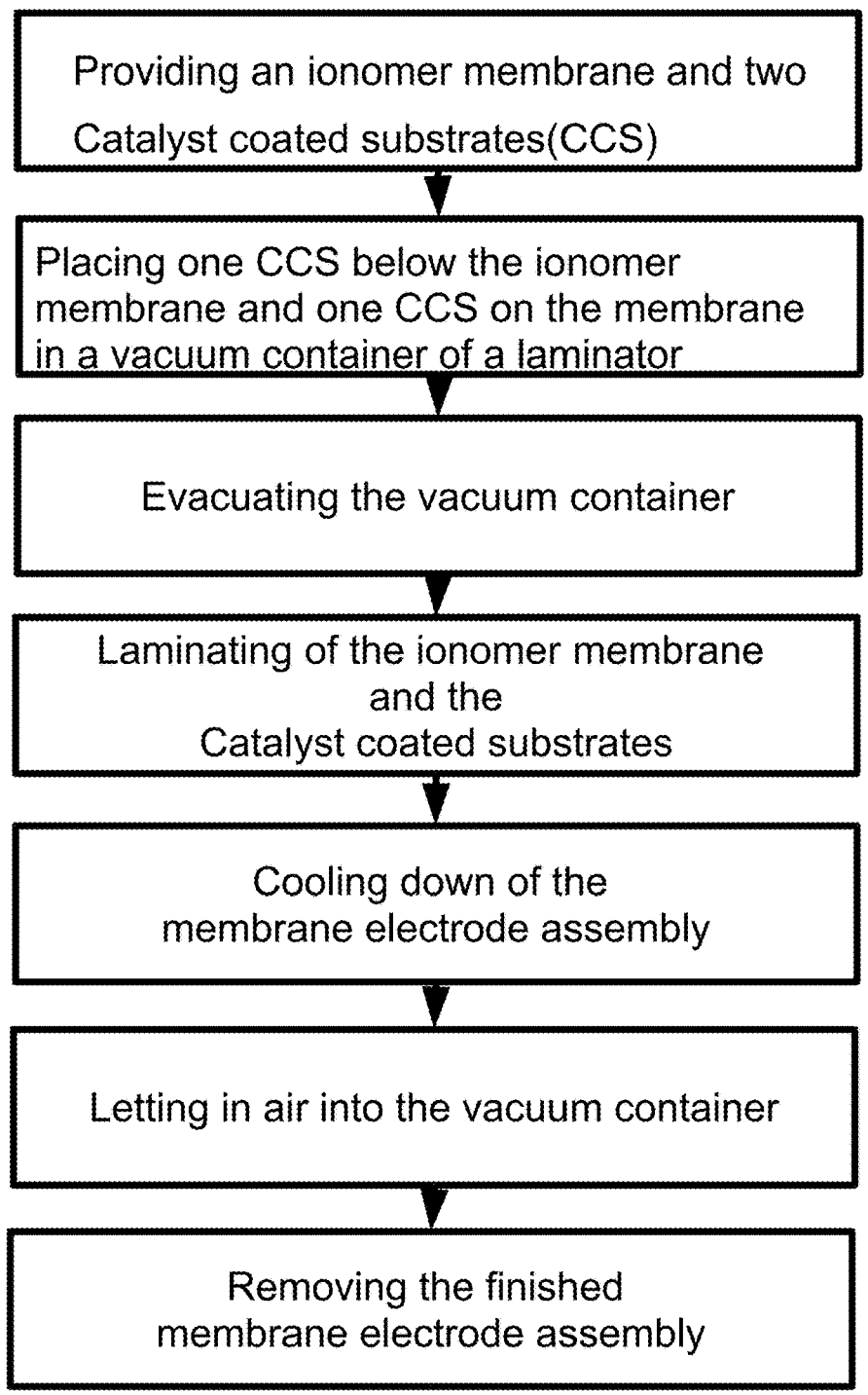
FIG. 17 shows the process steps for the manufacture of a MEA by laminating (roll bonding) a catalyst coated substrate on an ionomer membrane in a vacuum according to a further embodiment of the present invention.

The process of hot pressing of membrane electrode assemblies in vacuum comprises the steps of placing catalyst coated substrates and ionomer membranes in a vacuum container, evacuating said vacuum container and hot pressing of the ionomer membrane and catalyst coated substrates in vacuum (see FIG. 16). For the process of roll bonding of membrane electrode assemblies in vacuum the step of roll bonding is performed in a previously evacuated vacuum container as shown in FIG. 17.

Figure 18:
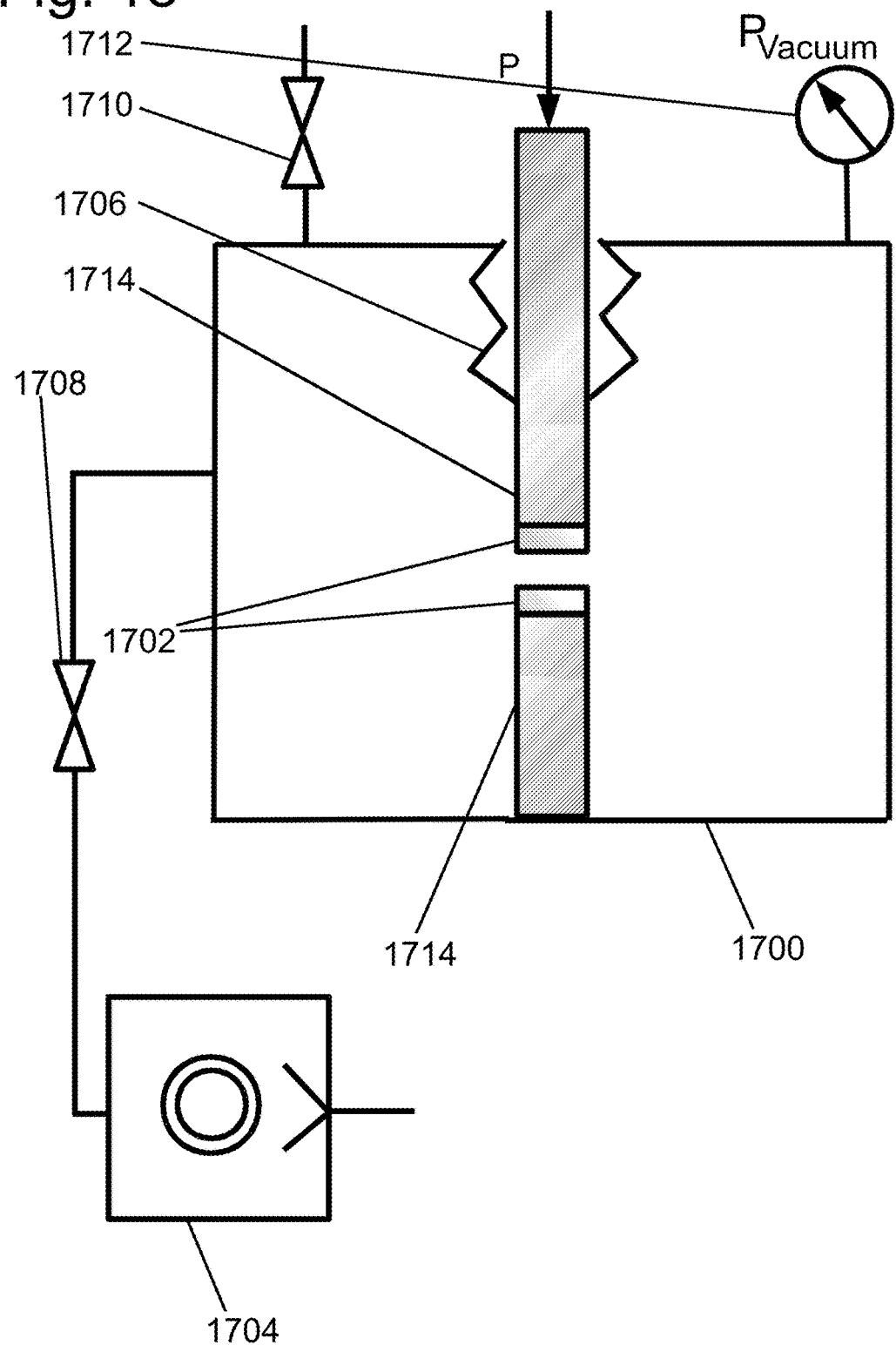
FIG. 18 shows a hot press for hot pressing a catalyst coated substrate on an ionomer membrane in a vacuum according to an embodiment of the present invention.

In a further embodiment of the invention heated dies (1702) of the hot press are mounted in a vacuum chamber (1700) as shown in FIG. 18 or a roll (602) of a laminator mounted in a vacuum chamber (600) as shown in FIG. 18.

The process of hot pressing a ionomer membrane to a catalyst coated substrate may be also used for manufacturing membrane electrode assemblies from catalyst coated substrates according to the present invention that comprise the sequence of layers as shown in FIG. 2A: a ionomer layer (210) that coats the electrocatalyst layer (208) comprising centers of an electrocatalyst (206) on a layer of an intrinsically conducting adhesive (204) on an electron-conducting substrate (200).

In a preferred embodiment of the invention the pressure within the vacuum chamber or bag is chosen below 20 mbar (2000 Pa) although higher pressures of up to about 100 mbar might be usable, too. In a more preferred embodiment of the invention the pressure is chosen below 10-16 mbar (1000-1600 Pa). In a most preferred embodiment of the invention a pressure of less than 1 mbar (100 Pa) is used. A pressure of 0.01 mbar (1 Pa) or less is optimum.

In such a hot pressing process in a vacuum inclusions of air are prevented by the removal of all air in the vacuum chamber by the vacuum pump before bonding of the membrane electrode assembly.

The vacuum inside the vacuum chamber or vacuum bag can be produced by means for producing a vacuum (1704, 604, 704) such as a water jet pump, a rotary vane pump or a membrane pump although other pumps such as a turbomolecular pump, a piston pump or a sorption pump might be used as well.

For the material of the vacuum chamber metals may be used although other materials might be also suitable.

Polyimide foil such as foil sold under the trademark "KAPTON" by E.I. DuPont de Nemours and Company, Wilmington, Del., and Polyimid-based heat resistant adhesive tape may be used for the vacuum bag shown in FIG. 20 although other materials like fluoropolymers such as perfluoralkoxy-polymers (PFA), PTFE, FEP or ETFE may be also used. Preferred material is polyimide film because of the excellent thermal stability and large thermal conductivity.

Figure 19:
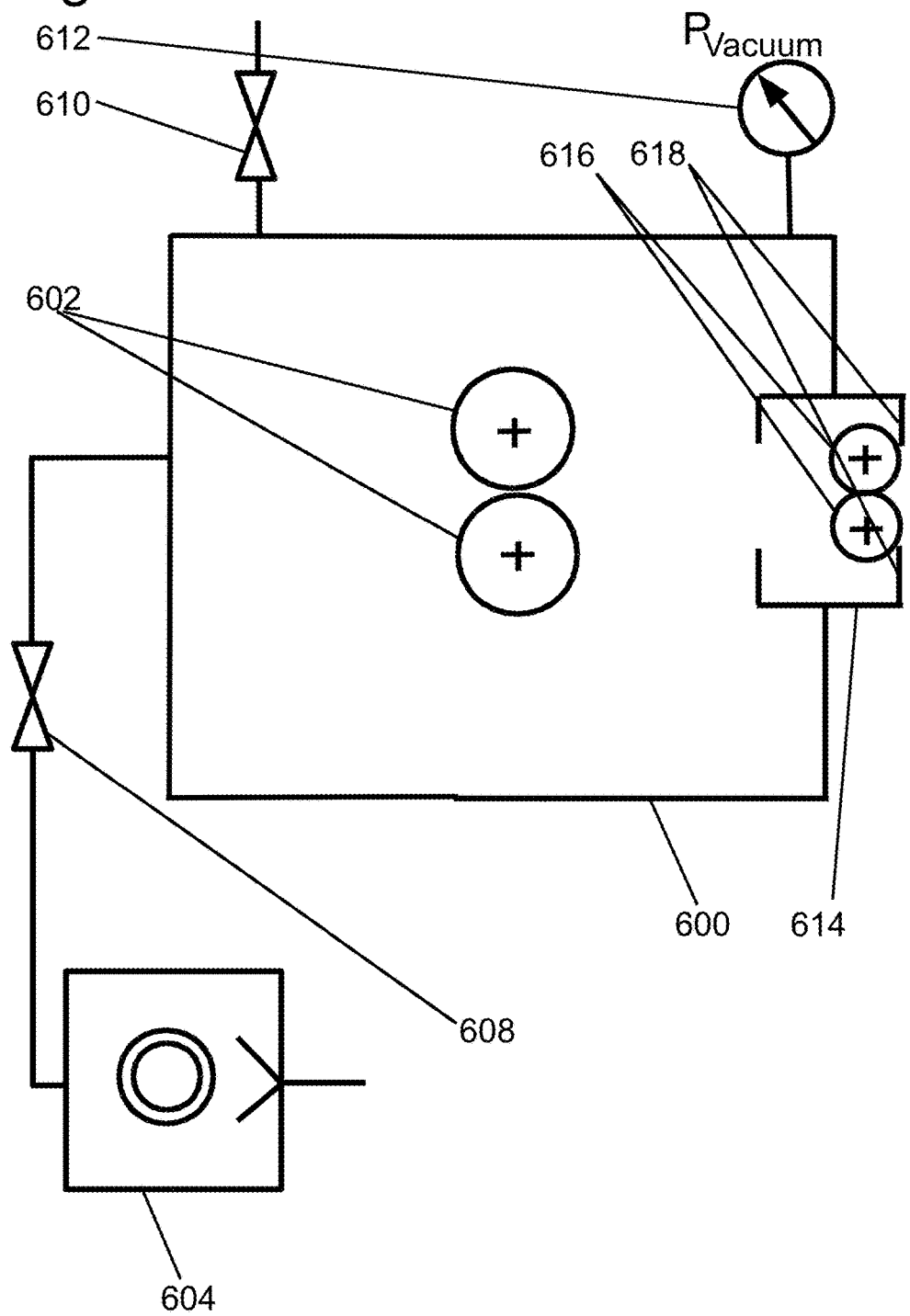
FIG. 19 shows a laminator for the manufacture of a MEA by laminating (roll bonding) a catalyst coated substrate on an ionomer membrane in a vacuum according to the present invention.

In order to transmit the motion of the die in the vacuum chamber of a hot press according to FIG. 18 a hydraulic system may be used as means for feed-through of motion but a lead-through for mechanical motions such as a spindle with bellows (1706) or a metal membrane, a polymer membrane, a spindle and O-rings or a radial sealing or a magnetic transmission or an electric motor with a suitable electrical feedthrough consisting of epoxy, rubber, glass or plastic may be used although other feed throughs might be useable, too. For a laminator according to FIG. 19 similar systems such as a spindle with radial sealings or O-rings may be used for driving the heated rolls (602). Electrical power for the heating can be transmitted via the above electrical feed-throughs.

The vacuum system for a vacuum hot press according to FIG. 18 further comprises a valve (1708, 608) between the vacuum pump (for example a rotary vane pump shown as 1704, 604) and a valve (1710, 610) for letting in air into the vacuum chamber (1700, 600). The vacuum system may be further comprising a system for measurement of the pressure $P_{vacuum}$ (1712, 612) in the vacuum chamber (1700, 600). Pressure P of a hydraulic system may be transmitted to the heated dies (1702) by a feedthrough using bellows (1706) for the spindles (1714).

A pressure P of the dies of 80-120 kg/cm' is preferred although higher or especially lower die pressures might be used for hot pressing of membrane electrode assemblies, too.

According to a further embodiment of the present invention the vacuum hot press shown in FIG. 18 and the vacuum laminator shown in FIG. 6 may be further comprising an inlet system (614 in FIG. 19) that permits transport of MEA components into and finished MEAs out of the vacuum container (1700, 600). Such an inlet system may be comprising means for inlet of MEA components such as an air lock or a system comprising two air-tight elastomer rolls (616) and an elastic sealing lid (618).

Figure 21:
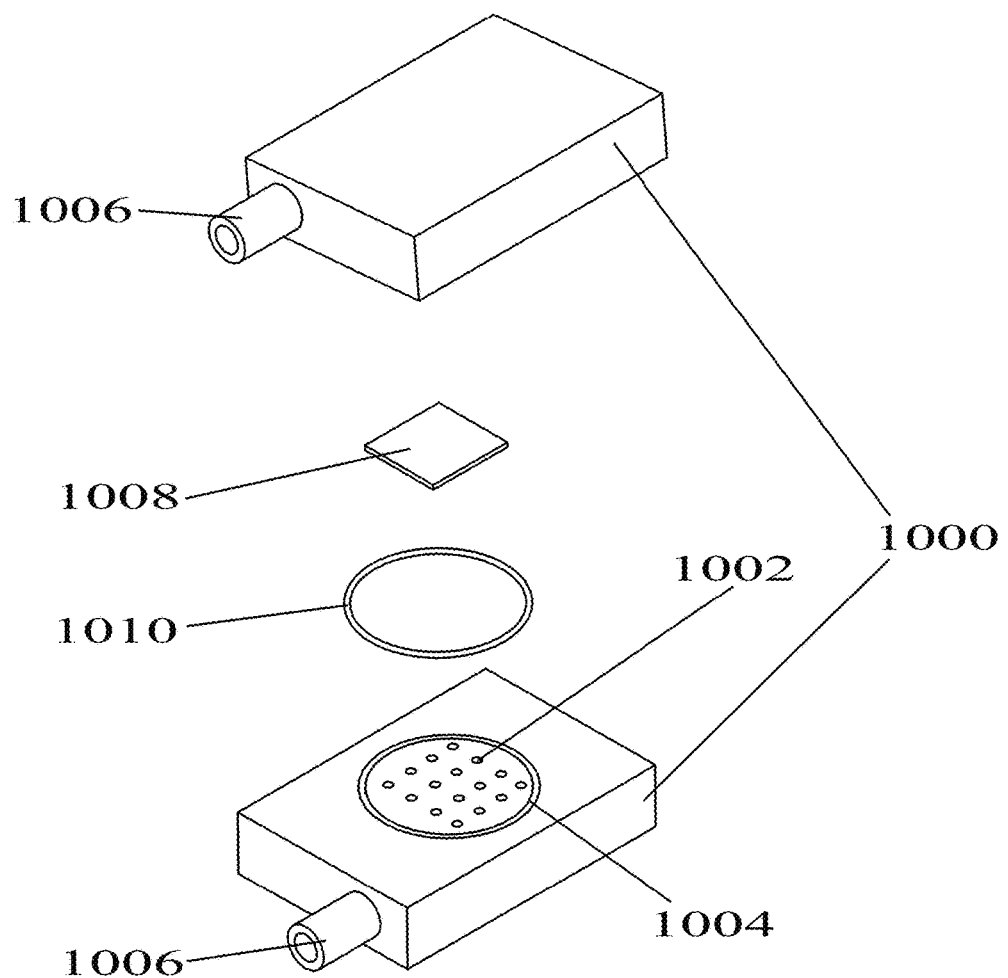
FIG. 21 shows a setup for a hot press for the production of membrane electrode assemblies for fuel cells using dies with a system of small channels for evacuating the space between the dies and a sealing for hot pressing under reduces pressure. The diameter of the channels in this drawing is exaggerated in order to explain the principle of operation.

According to a further embodiment of the present invention heated dies (1000) for hot pressing of membrane electrode assemblies under reduced pressure might comprise elements of foam metal or channels (1002) for evacuating the space between the dies as shown in FIG. 21 and a flexible sealing or gasket such as an O-ring (1010) from a heat-resistant elastomer such as silicone or PTFE as well as a hose to evacuate air from the dies using means for production of a vacuum. Foamed aluminum (produced from aluminum and titanium hydride) or other metal foams such as titanium sponge may be used although other materials might be suitable, too. With such dies a conventional hot press may be used for hot pressing membrane electrode assemblies free from inclusions of air.

For the manufacturing process according to the present invention the ionomer used in the catalyst layer (206 in FIG. 2) or the ionomer membrane (202 in FIG. 2) may be further comprising a plasticizer such as tetrabutylammonium ions for bonding by hot pressing such as produced by treatment of NAFION with tetrabutylammonium hydroxide.

A vacuum hot pressing process or lamination process that avoids hot pressing or lamination in air avoids the above problem of trapped air. Therefore a vacuum hot pressing process or a vacuum lamination process that perform the steps of hot pressing or laminating in a vacuum are preferred according to an embodiment of this invention.

BEST MODE OF CARRYING OUT THE INVENTION

The following examples illustrate the best mode of carrying out the embodiments of the invention. Examples 1-3 demonstrate the use of ruthenium coatings as electrocatalyst for hydrogen peroxide cathodes for fuel cells. Example 4 demonstrates measurement of a polarization curve of a massive ruthenium cathode.

EXAMPLES

Example 1

Preparation of a Ruthenium Electroplating Bath 1.97 g commercial ruthenium(III)chloride-hydrate ($RuCl_3 \cdot xH_2O$, reagent grade, 40.39% Ru, procured from Sigma-Aldrich, Taufkirchen, Germany) are dissolved in 78 ml deionized water. A solution of 11.625 g Sulfamic acid ($NH_2SO_3H$, p.a., ≥99%, procured from Fluka, Taufkirchen, Germany) in 78 ml deionized water is added and the solution is placed in a flask fitted with a Dimroth reflux condenser and the mixture is heated at the boil for 48 hours. During reflux the dark brown intransparent solution changes color to a transparent brown color. After cooling to room temperature the volume of the plating bath is adjusted to 310 ml (concentration about 30.6 mmole/l Ru).

Example 2

Electroplating of a Ruthenium Layer on Carbon Paper

A 1 cm×3 cm sheet of Toray TGP-H-120 carbon paper (procured from Quintech e.K., Goeppingen, Germany) is placed in a beaker filled with the ruthenium electroplating bath prepared according to example 1 that was heated prior use until the temperature of the bath reached 70° C. A 4 cm×4 cm platinum sheet (procured from Oegussa GmbH, Vienna, Austria) is used as anode and ruthenium is deposited at a current density of 10 $mA/cm^2$ and a voltage of 2.5V for 2 minutes. After electroplating the carbon paper is rinsed with deionized water and dried. Under a microscope the deposited ruthenium coating is clearly visible.

Example 3

Electroplating of a Smooth Ruthenium Layer on Nickel for Comparison of Polarization Curves A 1 cm×3 cm nickel sheet (99.9%, 0.1 mm thickness, procured from Alfa-Aesar GmbH&Co. KG, Karlsruhe, Germany) is used for ruthenium electroplating as described in example 2. A bright coating of ruthenium is deposited.

Example 4

Measurement of Polarization Curves for a Massive Ruthenium Cathode

A ruthenium cathode is prepared from a 31.1 gram ruthenium ingot (99.95% Ru, Pt 205 ppm, Pd<1 ppm, Ir<1 ppm, Os 7 ppm, Rh 1 ppm, Ag<1 ppm, ACI Alloys Inc., San Jose, Calif., USA). The polarization curve for the cathode of example 4 is nearly identical to the polarization curve of a thin ruthenium film according to example 3 in static solution of 2.32 M $H_2O_2$, 0.4 M $H_2SO_4$.

Examples 5-17 demonstrate electroplating of ruthenium-palladium-, ruthenium-iridium-, ruthenium-platinum-, ruthenium-rhodium-ruthenium-palladium-iridium-, ruthenium-rhenium-, ruthenium-palladium-rhenium-, ruthenium-iridium-rhenium-, and ruthenium-palladium-iridium-rhenium alloys for use as hydrogen peroxide cathode electrocatalysts. Examples 7, 8, 11, 12, and 13 demonstrate electroplating of most preferred electrocatalyst alloy films for comparison purposes.

Example 5

Preparation of a Palladium Electroplating Bath 0.275 g Palladium(II) chloride ($PdCl_2$, procured from Riedel de Haen, Taufkirchen, Germany) are suspended in 16.9 g deionized water and 1.0 ml 25% ammonia solution (pro analysi, procured from Fluka AG, Buchs, Switzerland) is added dropwise under stirring and heating at 70° C. until all palladium chloride dissolves. 5 gram sulfamic acid (99%, procured from Fluka AG, Buchs, Switzerland) are added and the solution is filled into a flask equipped with a reflux condenser and heated for 24 hours at boiling temperature. After cooling 65.9 g deionized water are added to the solution to make up 82.5 ml palladium electroplating bath. The color of the solution changes to light yellow.

Example 6

Preparation of an Iridium Electroplating Bath 0.183 g Potassium hexachloroiridate(IV) ($K_2IrCl_6$) are dissolved in 16 ml deionized water. 2.30 g sulfamic acid are added and the mixture is boiled in a flask fitted with a reflux condenser for 48 hours. After cooling deionized water is added to make 70 ml electroplating bath.

Example 7

Preparation of a Ruthenium-Palladium-Iridium Electroplating Bath 8 ml of the ruthenium plating bath of example 1 are mixed with 0.266 ml palladium electroplating bath of example 5 and 0.245 ml iridium plating bath of example 6. Electroplating baths for ruthenium-palladium or ruthenium-iridium can be prepared by mixing above ruthenium plating bath with the above amounts of palladium or iridium electroplating baths.

Example 8

Electroplating of a Ruthenium-Palladium-Iridium Film on a Nickel Sheet

A 1 cm×3 cm nickel sheet (99%, procured from Alfa-Aesar GmbH&Co. KG, Karlsruhe, Germany) is placed in the electroplating bath of example 7 that was heated prior use until the temperature of the bath reached 70° C. A 4 cm×4 cm platinum sheet is used as anode and a ruthenium-palladium-iridium alloy is deposited at a current density of 11 mA/$cm^2$ for 1 minute. After electroplating the coated nickel sheet is rinsed with deionized water and dried. According to a preliminary analysis by SEM/EDX the deposited film consists of about 91.8 at.-% ruthenium, about 6.4 at.-% palladium and about 1.8 at.-% iridium.

Example 9

Measurement of a Polarization Curve for a Hydrogen Peroxide Cathode According to Example 8

A ruthenium-palladium-iridium coated nickel sheet prepared according to example 8 is used as a cathode in a fuel cell using a catholyte that contains 2.32 M $H_2O_2$, 0.4 M $H_2SO_4$ against a magnesium anode (99.99% Mg, procured from Dead Sea Magnesium Ltd., Beer Sheva, Israel). The potential of the cathode is measured against a Palladium electrode that was in 0.5 M $H_2SO_4$ as reversible hydrogen electrode. FIG. 6 shows a polarization curve of of the ruthenium-palladium-iridium cathode in a static solution.

Example 10

Electroplating of a Ruthenium-Palladium-Iridium Film on a Carbon Paper

A 1 cm×3 cm sheet of Toray TGP-H-120 carbon paper (procured from Quintech e.K., Goeppingen, Germany) is placed in a beaker filled with the electroplating bath prepared according example 7 that was heated prior use until the temperature of the bath reached 70° C. A 4 cm×4 cm platinum sheet (procured from Oegussa GmbH, Vienna, Austria) is used as anode and ruthenium is deposited at a current density of 10 mA/$cm^2$ for 1 minutes. After electroplating the carbon paper is rinsed with deionized water and dried.

Example 11

Preparation of a Rhenium Electroplating Bath 0.27 g of potassium perrhenate ($KReO_4$, procured from Alfa-Aesar GmbH&Co. KG, Karlsruhe) are dissolved in 27 ml deionized water by stirring at 70° C. 0.8 ml conc. sulfuric acid (p.a., procured from Fluka AG, Buchs, Switzerland) and 0.675 g Magnesium sulfate ($MgSO.7H_2O$, p.a., procured from Fluka, Taufkirchen, Germany) are added.

Example 12

Preparation of a Ruthenium-Palladium-Iridium-Rhenium Electroplating Bath

According to example 7 an ruthenium-palladium-iridium-electroplating bath is prepared and 0.1 ml of the rhenium electroplating bath of example 11 are added.

Example 13

Electroplating of a Ruthenium-Palladium-Iridium-Rhenium Film

Electroplating of a Ru—Pd—Ir—Re-alloy on a 1 cm×3 cm nickel sheet is performed as in example 8.

Example 14

Preparation of a Solution of $Pt(NH_3)_2(NO_2)_2$ 0.125 g potassium hexachloroplatinate(IV) ($K_2PtCl_6$, procured from Alfa-Aesar GmbH&Co. KG, Karlsruhe, Germany) are suspended in 2 ml DI water. A concentrated solution of 1.250 g sodium nitrite (p.a., procured from Fluka AG, Buchs, Switzerland) in 2.83 ml deionized water are added. The mixture is heated to about 60° C. under stirring for 30 minutes until all platinum salt dissolves. A pale yellow solution of $K_2Pt(NO_2)_4$ forms. When the solution has cooled to room temperature 50 µl 25% Ammonia solution (p.a., procured from Fluka AG, Buchs, Switzerland) are added.

Example 15

Preparation of a Platinum Electroplating Bath 0.806 g Sulfamic acid (p.a., procured from Fluka, Taufkirchen, Germany) are added to a solution of $Pt(NH_3)_2(NO_2)_2$ prepared according to example 14. 16.12 ml deionized water are added and the solution is heated at boiling temperature until a clear pale yellow solution is obtained.

Example 16

Preparation of a Ruthenium-Platinum Electroplating Bath 8 ml of the ruthenium plating bath of example 1 are mixed with 0.2 ml platinum electroplating bath of example 15.

Example 17

Rhodium Electroplating Bath 51.3 mg rhodium sulfate (procured from Sigma-Aldrich, Taufkirchen) are dissolved in 25.7 ml deionized water. 400 mg sulfamic acid are added. The yellow solution is heated at boil for 3 hours.

Examples 18-22 demonstrate the production of hydrogen peroxide (or oxygen) cathodes using most preferred supported or preferred unsupported electrocatalysts bonded by intrinsically conducting adhesives. The products and reaction mixtures of examples 20 and 22 should be handled with adequate safety precautions as occasional accidents (explosions) of by-products are reported in the literature.

Example 18

Preparation of an Intrinsically Electron-Conducting Adhesive 29.5 mg Polyaniline (emeraldine base; PANI-EB $M_w$=50,000 g/mole, procured from Sigma-Aldrich) were dissolved in 1.73 g Dimethyl sulfoxide (>99.5%, procured from Fluka AG, Buchs) under stirring at 60° C. After cooling 176.6 mg 5% "FUMION FL-905" (procured from Fuma-Tech GmbH, St. Ingbert) solution were added. 29.3 mg PANI-EB were dispersed in 0.1217 g of this PANI-EB-DMSO-ionomer solution. Instead of "FUMION FLNA-905" solution 5% "NAFION"-solution (procured from Sigma-Aldrich) in a mixture of alcohols and water may be used.

Example 19

Preparation of a Fuel Cell Cathode Using Supported Ruthenium Electrocatalyst Electron conducting adhesive prepared according to example 18 was applied to a 9.5×19 cm sheet of "Toray TGP-H-060" carbon paper (procured from Quintech e.K., Goppingen). 5% ruthenium on carbon electrocatalyst (procured from Alfa-Aesar GmbH&Co. KG, Karlsruhe, Germany) was dispersed on the adhesive layer and the adhesive was dried. The catalyst loading was 7.3 mg/cm'. After drying of the adhesive for 12 hours at room temperature and 5 minutes at 60° C. a 5% dispersion of "FUMION FLNA-905" ionomer was applied to the surface of the electrode and the electrode was dried at room temperature.

Example 20

Preparation of a Ruthenium-Palladium-Iridium Black Electrocatalyst 314.5 mg Ruthenium(III) chloride ($RuCl_3$.x $H_2O$, Aldrich, Taufkirchen, Germany) were dissolved in 70 ml deionized water. A solution prepared by dissolving 5.8 mg Palladium(II) chloride ($PdCl_2$) in 3.42 ml deionized water and 0.1 ml 25% ammonia solution by stirring and heating and a solution of 14.1 mg Potassium hexachloroiridate(IV) ($K_2IrCl_6$, procured from Alfa-Aesar GmbH&Co. KG, Karlsruhe) in 6.19 ml deionized water were added. The solution is cooled with an ice bath to +5° C.

0.23 g Sodium borohydride ($NaBH_4$, p.A., >96%, procured from Fluka, Taufkirchen) were dissolved in 9.04 ml deionized water and the solution was added dropwise by a dropping funnel under stirring within 30 minutes while the temperature of the ruthenium-palladium-iridium salt solution was kept between +6 and +8° C. Hydrogen evolved and ruthenium-palladium-iridium black forms. The solution was stirred for 12 hours, filtered through a sintered glass disc filter funnel (porosity G3) and the electrocatalyst was washed with deionized water, absolute ethanol and absolute ether.

Example 21

Preparation of a Cathode with a Ruthenium-Palladium-Iridium Black Catalyst

The electron conducting adhesive of example 16 was applied to a 1×3 cm sheet of "Toray TGP-H-060" carbon paper. Ruthenium-palladium-iridium-black electrocatalyst prepared in example 20 was dispersed on the adhesive layer and the adhesive was dried. The catalyst loading was 19.8 mg/cm$^2$. After drying of the adhesive for 12 hours at room temperature and 5 minutes at 60° C. a 5% dispersion of "FUMION FLNA-905" ionomer was applied to the surface of the electrode and the electrode was dried at room temperature.

Example 22

Measuring the Polarization Curve of the Electrode According to Example 21

The cathode electrode manufactured according to example 21 is placed in an holder that was manufactured from Poly(methylmethacrylate) (PMMA) commonly sold under the trademark "PLEXIGLAS" by Evonik Roehm GmbH, 64293 Darmstadt, Germany. The cathode is fixed by a strip of titanium sheet (procured from Small Parts Inc., Seattle, Wash., USA) fastened to the holder by nylon or PTFE screws (procured from Small Parts Inc., Seattle, Wash., USA). A 0.4 mm Haber-Luggin-capillary that consists of borosilicate glass commonly sold under the trademark DURAN by Schott AG Glaswerke, Mainz, Germany (now Duran-Group) is mounted in the holder about 0.8 mm in front of the cathode. A Pd-wire (procured from Aldrich, Taufkirchen) loaded with hydrogen by electrolysis prior use in 0.5 M $H_2SO_4$ (procured from Riedel de Haen, Taufkirchen) is used as reference electrode within the reference capillary. The cathode and the Haber-Luggin-capillary is placed in a static solution of 2.3 M $H_2O_2$, 0.5 M $H_2SO_4$ (procured from Fluka, Taufkirchen/Buchs). A magnesium electrode (99.7%, procured from Fluka, Taufkirchen) was used as counter electrode. There is a considerable amount of oxygen generated by the ruthenium alloy black electrocatalyst of this electrode.

Example 22-28 demonstrate the manufacture of a most preferred ruthenium-palladium-iridium electrocatalyst on "Vulcan XC72R" carbon black and the most preferred intrinsically electron-conducting pressure sensitive adhesive. In a first step "Vulcan-XC72R" is etched by nitric acid in oder to improve wettability. In Example 25 the manufacture of the most preferred intrinsically conducting pressure sensitive adhesive is demonstrated.

Example 23

Preparation of Etched "Vulcan XC72R"

0.2494 g "Vulcan XC72R" (Cabot Corporation, Boston, Mass.) were dispersed in 5.16 g concentrated nitric acid (pro analysi, 64-66%, procured from Fluka AG, Buchs, Switzerland) and heated to 65° C. for 6 hours. The solution was cooled and filtered through a sintered glass disc filter funnel (G3 porosity) and washed with deionized water until the filtrate was neutral and the etched carbon black was dried.

Example 24

Preparation of a RuPdIr Electrocatalyst on "Vulcan XC72R" (30% Ru Load)

165.5 mg etched "Vulcan XC72R" of example 23 were dispersed in 7.1965 g deionized water by stirring. 123.1 mg commercial ruthenium(III) chloride ($RuCl_3 \cdot x\ H_2O$, procured from Sigma-Aldrich, Taufkirchen, Germany) were dissolved in 34.94 g deionized water. A palladium chloride solution (prepared by dissolving 5.5 mg anhydrous palladium(II) chloride ($PdCl_2$) procured from Riedel de Haen, Taufkirchen, Germany in 2.22 g deionized water and 0.3 ml 25% ammonia solution by stirring and heating to 70° C.) and a solution of 17.3 mg Potassium hexachloroiridate(IV) ($K_2IrCl_6$, procured from Alfa-Aesar GmbH&Co. KG, Karlsruhe, Germany) in 15.94 g deionized water were added. The solution is cooled with an ice bath to +5° C. and stirred.

0.1377 g Sodium borohydride ($NaBH_4$, p.A., >96%, procured from Fluka, Taufkirchen, Germany) were dissolved in 3.7 g deionized water and the solution was added dropwise by a dropping funnel under stirring within 30 minutes while the temperature of the ruthenium-palladium-iridium salt solution was kept between +6 and +8° C. Hydrogen evolved and ruthenium-palladium-iridium deposits on the "Vulcan XC72R" carbon black. The solution was stirred for 12 hours, filtered through a sintered glass disc filter funnel (porosity G3) and the electrocatalyst was washed with deionized water, absolute ethanol and absolute ether and dried. The electrocatalyst is powdered using a mortar and pestle prior use. According to an analysis by SEM-EDX the catalyst contains 76.6-84% (by weight) ruthenium, about 0.8-1.0% palladium and about 15.2-22.4% iridium, i.e. 85.8-90.6 at.-% ruthenium, about 0.8-1.06 at.-% palladium and about 8.6-13.2 at.-% iridium based on the transition metal content.

Example 25

Preparation of an Intrinsically Conducting Adhesive 63.7 mg Polyaniline (emeraldine base; PANI-EB $M_w$=50,000 g/mol, procured from Sigma-Aldrich GmbH, Taufkirchen, Germany) were dissolved in 2.50 g Dimethyl sulfoxide (>99.5%, procured from Fluka AG, Buchs, Switzerland) under stirring at 60° C. The solution was cooled to room temperature. 253.5 mg of this PAM solution were placed in an aluminium dish and 92.4 mg of the above PANI-EB powder and 127.2 mg 5% "NAFION" solution (procured from Sigma-Aldrich GmbH, Taufkirchen) in lower alcohols and water were added.

Prospective Example 26

Preparation of a Conducting Pressure Sensitive Adhesive 60 mg PANI (emerald base) are placed in a beaker and 0.509 g Dodecylbenzene sulfonic acid (DBSA) are added. 5.5 ml absolute ethanol are added and the solution is heated for 2 hours under stirring at 50° C. Finally the ethanol is removed by distillation. The produced PANI-DBSA-salt is dissolved in 14 g p-xylene.

6 g of this PANI-DBSA-solution in p-xylene are dissolved in 7 g xylene. 0.51 g polystyrene-block-(polyethylene-ran-polybutylene)-block-polystyrene (SEBS) copolymer are dissolved in 5.5 g p-xylene. 2.5 g poly-α-pinene are added. The PANI-DBSA-solution and the SEBS-poly-α-pinene PSA are mixed and yield an intrinsically conducting pressure sensitive adhesive.

Example 27

Preparation of a Conducting Pressure Sensitive Adhesive 269 mg of colophony (procured from Fluka AG, Buchs, Switzerland are dissolved in 3.462 g 2-propanol (procured from Fluka, Taufkirchen, Germany). 72.5 mg of an aqueous solution of PEDOT:PSS (procured from Sigma-Aldrich, Taufkirchen) are added to 161.2 mg of the colophony solution. The prepared adhesive is applied to a carbon paper using a brush. The electrocatalyst is scattered on the adhesive layer while the adhesive is sticky.

Example 28

Preparation of a Cathode with RuPdIr on "Vulcan XC72R"

A 3 cm×1 cm strip of Toray TGP-H-120 carbon paper is coated by the intrinsically electron conducting adhesive of example 25 or the intrinsically conducting pressure sensitive adhesive of example 26. The adhesive is dried prior coating the electrode with electrocatalyst if the pressure sensitive adhesive (PSA) of example 26 is used. Otherwise the wet adhesive layer is coated with electrocatalyst. 12.9 mg electrocatalyst prepared according to example 23 are distributed on the adhesive layer. If the PSA adhesive according to example 26 is used pressure can be applied to coat the electrode while dipping it in a pile of powdered electrocatalyst and an excess of electrocatalyst may be removed with a brush. Preferred is electrostatic application of the electrocatalyst powder. Otherwise the electrode is dipped into catalyst powder for coating.

The electrode is dried for 12 hours at room temperature and 2 minutes at 60° C. 1.0 ml 5% "NAFION" solution in water/alcohol is dropped on the electrode. Excess solution may be removed from the edge of the electrode using a paper towel. The electrode is dried for 48 hours at room temperature prior use.

Example 29

Measurement of the Polarization Curve of a Cathode Prepared According to Example 28

Figure 8:
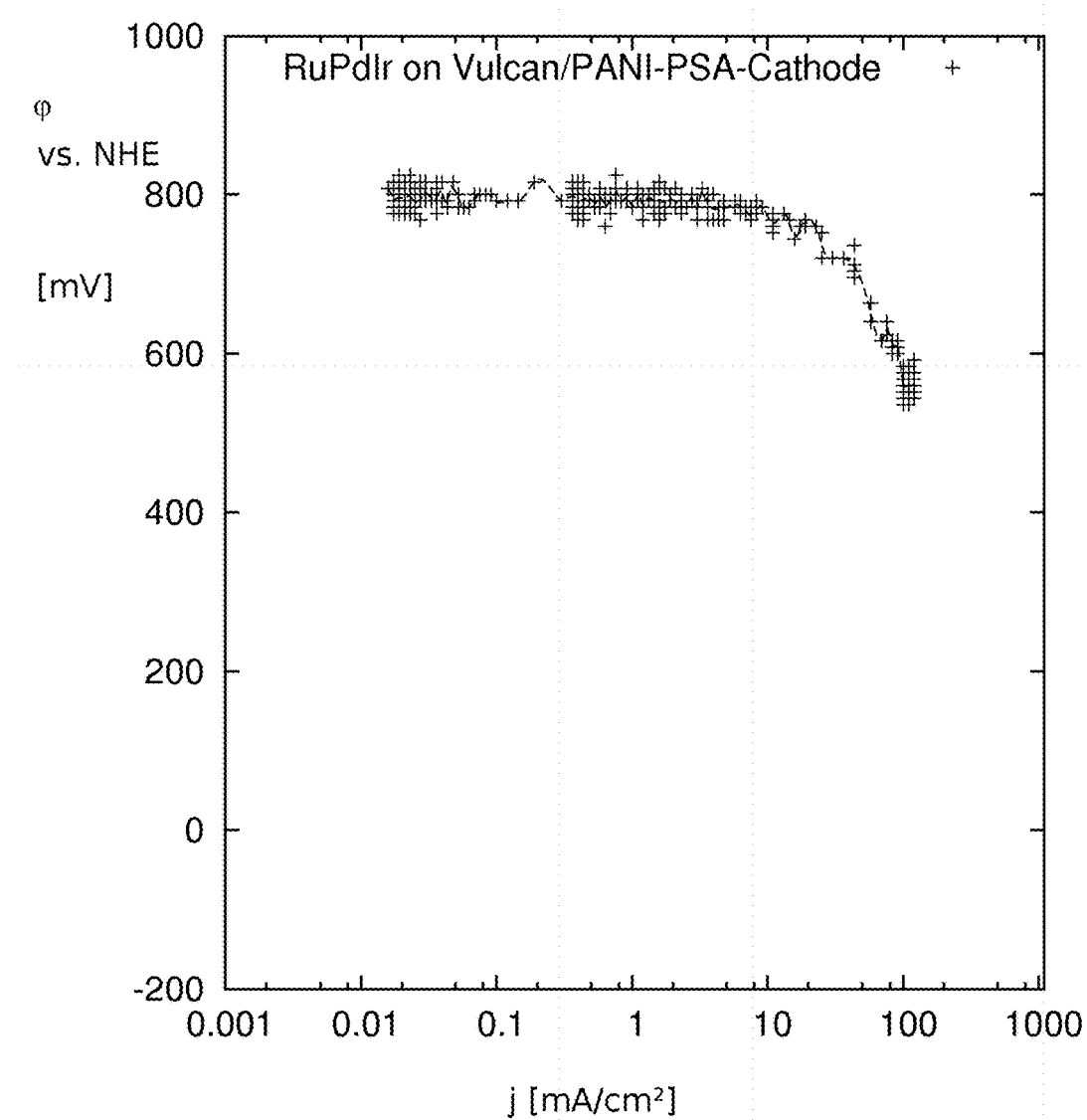
FIG. 8 shows a polarization curve of a cathode according to the present invention comprising ruthenium-palladium-iridium (2 at.-% Pd, 2 at.-% Ir) on etched "VULCAN XC72R" carbon black bonded to Toray TGP-H-120 carbon paper using an intrinsically conducting adhesive. This measurement was performed in a static electrolyte of 2.3 M hydrogen peroxide/0.5M sulfuric acid without stirring against a magnesium anode at 20° C.

A cathode prepared according to example 27 is fixed in the holder according to example 22. As in example 22 a Haber-Luggin capillary is used for the RHE reference electrode in 0.5 M sulfuric acid. A magnesium electrode (99.7%) is used as anode. FIG. 8 shows the polarization curve obtained.

Examples 30-32 demonstrate the use of catholytes comprising Caro's-Acid or Peracetic acid.

Example 30

Figure 9:
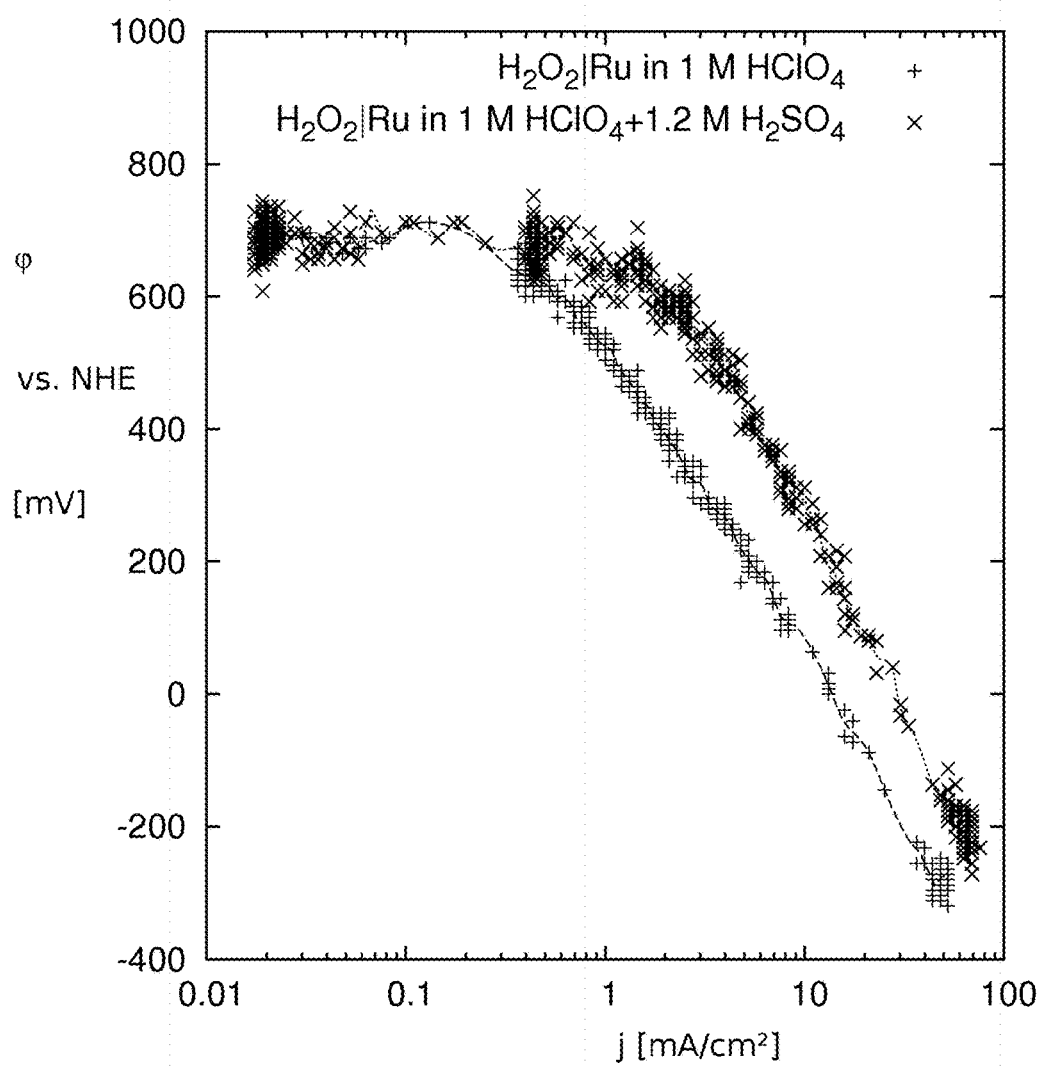
FIG. 9 shows a polarization curve of a ruthenium cathode in an electrolyte of $H_2O_2$/1 M perchloric acid with and without an 1.2 M sulfuric acid additive in order to demonstrate the influence of formation of Caro's acid $H_2SO_5$ on the polarization curve.

Catholyte Comprising Caro's Acid 20.00 ml 35% hydrogen peroxide (pro analysi, d=1.12924 g/ml at 21.5° C., about 34.85% content after storage, procured from Fluka, Taufkirchen, Germany) are mixed with 29.376 g deionized water in a volumetric flask. 5.1349 g concentrated sulfuric acid (98%, pro analysi, procured from Fluka AG, Buchs, Switzerland) are added and deionized water is added to make up to 100 ml volume. The solution contains about 0.513 mol/l $H_2SO_4$, about 2.314 mol/l $H_2O_2$ and immediately forms about 0.009 M $H_2SO_5$. FIG. 9 shows a polarization curve of a 1 cm×3 cm ruthenium coated nickel sheet against a magnesium anode in this electrolyte.

Example 31

Catholyte Comprising Peracetic Acid

170 μl Acetic acid (>98%) are added to 14.834 g of the catholyte of comparative example 32. The solution is about 0.2 M in acetic acid. The polarization curve of a 4 cm×4 cm platinum sheet against a magnesium anode in this electrolyte is measured.

Comparative Example 32

Catholyte Comprising Hydrogen Peroxide in 1 M Perchloric Acid 15 ml 1 M perchloric acid was prepared from 70% perchloric acid (p.a.). 12.37 g of this solution was placed in a 25 ml volumetric flask. 5.00 ml 35% hydrogen peroxide (p.a., d=1.12924 g/ml at 21.5° C.) are added and 1 M perchloric acid is added to make up 25 ml volume. FIG. 9 shows the polarization curve of a 1 cm×1 cm ruthenium coated nickel sheet against a magnesium anode in this electrolyte.

The following examples illustrate the best mode of carrying out the embodiments of the invention. Example 33 illustrates the preparation of a polyimide bag for hot pressing of a membrane electrode assembly in a vacuum. Example 34 illustrates its use in hot pressing a membrane electrode assembly.

Example 33

Preparation of a Polyimide Bag for Hot Pressing of MEAs Under Vacuum

A 30.4 cm×20 cm sheet of KAPTON foil (0.025 mm thickness; procured from RS-Components, Moerfelden-Walldorf, Germany) is folded to form a 10 cm×10 cm tube of KAPTON foil. KAPTON adhesive tape with silicone high temperature adhesive (TESA 51408, manufactured by Beiersdorf AG, Hamburg, Germany) is used to glue the foil together in order to produce an airtight bag consisting essentially of polyimide.

Example 34

Use of a Polyimide Bag for Hot Pressing a MEA in Vacuum

A 2.5×2.5 cm piece of an ionomer membrane (NAFION 112 procured from Fuel Cell Store, Boulder, Colo.) is placed in the polyimide bag of example 1. A catalyst coated substrate (CCS) is prepared from a sheet of carbon paper (Toray TGP-120, procured from Quintech e.K., Goeppingen, Germany) and a platinum black electrocatalyst (HISPEC 1000, procured from Alfa-Aesar GmbH&Co. KG, Karlsruhe, Germany) in NAFION solution in lower aliphatic alcohols and water (procured from Sigma-Aldrich, Taufkirchen, Germany) as an ink. The catalyst coated substrate is placed on the NAFION membrane. A second catalyst coated substrate may be placed below the ionomer membrane. A tube of polyethylene is bonded to the polyimide bag by KAPTON adhesive tape and a fiber reinforced PVC tube is attached to the polyethylene tube using adhesive tape. The other end of the PVC tube is attached to a vacuum pump and the polyimide bag is evacuated. The dies of the hot press are heated up to a temperature of 135-140° C. and the NAFION-membrane-CCS-stack within the polyimide bag is placed between the die and is pressed with the hydraulic press using a die-pressure of about 80-120 kg/cm'. After 3 minutes the hydraulic pressure is reduced in order to remove the bag and air is allowed to stream into the polyimide bag. Finally the pressed MEA is removed from the polyimide bag. The above process yields MEAs free from any inclusions of air between ionomer membrane and electrocatalyst layer.

Although the present invention has been described in considerable detail with reference to certain preferred embodiments thereof, other versions are possible. For example it is possible to bond a carbon black layer as a pre-catalyst instead of the electrocatalyst on the adhesive layer that will be converted to the electrocatalyst by applying a metal salt and a reducing agent. Therefore, the spirit and scope of the appended claims should not be limited to the description of the preferred embodiments contained herein.

The reader's attention is directed to all papers and documents which are filed concurrently with this specification, and the contents of all such papers and documents are incorporated herein by reference. All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any element in a claim that does not explicitly state "means for" performing a specified function, or "step for" performing a specific function, is not to be interpreted as a "means" or "step" clause as specified in 35 U.S.C. § 112, ¶6. In particular the use of "step of" in the claims herein is not intended to invoke the provisions of 35 U.S.C. § 112, ¶6.

Insofar the description above and the accompanying drawings disclose any additional subject matter that is not within the scope of the claims below, the inventions are not dedicated to the public and the right to file one or more applications to claim such additional inventions is reserved.

What is claimed is:

1. A cathode electrocatalyst for hydrogen peroxide cathodes characterized in that said cathode electrocatalyst comprises a ruthenium alloy comprising at least 90 atomic-% ruthenium and palladium as a first transition metal $Me_I$ in a mole percentage $x(Me_I)$ between 0.1 atomic-% and 5 atomic-% and iridium as a second transition metal $Me_{II}$ in a mole percentage $x(Me_{II})$ between 0.1 at.-% and 10 at.-%,
   balance ruthenium and incidental constituents and impurities
   having a sufficient activity for reduction of hydrogen peroxide in an acidic solution,
   wherein said ruthenium alloy is deposited on an electron-conducting support material in the form of a thin film or nanoparticles or as a metal black.

2. A cathode electrocatalyst according to claim 1, wherein said support material is a high surface area carbon black support.

3. A cathode electrocatalyst according to claim 1, wherein said ruthenium alloy further comprises rhenium as a metal different from said first transition metal and said second transition metal wherein the mole percentage $x(Me_{III})$ of rhenium is chosen as 0.1 atomic-% to 10 atomic-% and the mole percentage of the second transition metal is chosen as:
   0.1 at.-% to 100 at.-%-90 at.-%-$x(Me_I)$-$x(Me_{III})$.

4. A cathode electrocatalyst according to any of claim 1, wherein said ruthenium alloy comprises 1 at.-% to about 5 at.-% palladium, 1 at.-% to about 5 at.-% iridium, balance ruthenium.

5. A cathode electrocatalyst according to claim 4, wherein said ruthenium alloy further comprises 0.1 at.-% to about 5 at.-% rhenium, balance ruthenium.

6. A cathode electrocatalyst according to claim 1 in a fuel cell using a hydrogen peroxide cathode.

7. A cathode electrocatalyst for hydrogen peroxide fuel cells according to claim 1 that is produced by reduction of ruthenium-ions and at least two other type of transition metal ions from a solution comprising a ruthenium-salt or complex and at least two transition metal salts or complexes selected from the group consisting of palladium-salts, iridium-complexes, rhodium-salts and osmium-complexes wherein said solution comprises based on the transition metal content:
   a) 0 atomic-% to 10 atomic-% of rhenium;
   b) 0.1 atomic-% to 5 atomic-% of palladium; and
   c) 0.1 atomic-% to 20 atomic-% of iridium,
   balance ruthenium and incidental constituents and impurities.

8. A cathode electrocatalyst for hydrogen peroxide fuel cells according to claim 7, wherein said reduction is done by electroplating a ruthenium alloy from an electroplating bath comprising based on the transition metal content:
   (a) 0 atomic-% to 10 atomic-% of a rhenium electroplating bath;
   (b) 0.1 atomic-% to 5 atomic-% of a palladium electroplating bath; and
   (c) 0.1 atomic-% to 20 atomic-% of an osmium or iridium electroplating bath,
   (d) balance of a ruthenium electroplating bath produced by heating a solution of ruthenium(III) chloride and sulfamic acid.

9. A cathode electrocatalyst according to claim 8 that is produced by electroplating in an electroplating bath wherein said palladium-, and iridium electroplating baths are produced by a process comprising the step of:
   bringing in contact a solution comprising
   (a) palladium chlorides, or
   (b) alkali hexachloroiridates
   and sulfamic acid or alkali sulfamates or ammonium sulfamates.

10. A cathode electrocatalyst for hydrogen peroxide fuel cells according to claim 7 wherein reduction of said metal ions is accomplished by reduction of a solution of transition metal salts comprising:
    (a) 0.1 atomic-% to 5 atomic-% of a palladium salt; and
    (b) 0.1 atomic-% to 20 atomic-% of an iridium salt,
    (c) balance of a ruthenium salt
    by a solution of a borohydride.

11. A method of using a cathode electrocatalyst that comprises the step of: Bringing in contact a cathode electrocatalyst comprising at least 50 atomic-% ruthenium and a first transition metal selected from the group consisting of palladium, iridium, rhenium, platinum, rhodium and osmium in contact with an acidic hydrogen peroxide solution comprising over 0.5 mol/l hydroxgen peroxide, wherein $x(Me_I)$ is chosen as 0.01 atomic-% to 20 atomic-%, balance ruthenium and incidental constituents and impurities.

12. A method of using a cathode electrocatalyst according to claim 11, wherein said ruthenium alloy further comprises a second transition metal selected from the group consisting of rhenium, rhodium, palladium, platinum, osmium, and iridium different from said first transition metal in a mole percentage $x(Me_{II})$, wherein $x(Me_{II})$ is chosen dependent on the mole percentage of the first transition metal $x(Me_I)$ as:
    0.1 at.-% to 100 at.-%-50 at.-%-$x(Me_I)$.

13. A method of using an electrocatalyst according to claim 12, wherein said ruthenium alloy comprises palladium as metal $Me_I$ in a mole percentage $x(Me_I)$ between 0.1 at.-% and 5 at.-% and iridium as metal $Me_{II}$ in a mole percentage x(Me$_{II}$) between 0.1 at.-% and 10 at.-%, balance ruthenium and incidental constituents and impurities.

14. A method of using an electrocatalyst according to claim 13, wherein said ruthenium alloy comprises 1 at.-% to about 5 at.-% palladium, 1 at.-% to about 5 at.-% iridium, balance ruthenium.

15. A method of using an electrocatalyst according to claim 14, wherein said ruthenium alloy further comprises 0.1 at.-% to about 5 at.-% rhenium, balance ruthenium.

16. A method of using an electrocatalyst according to claim 11, wherein said ruthenium alloy is produced by reduction of ruthenium-ions and at least two other types of transition metal ions from a solution comprising a ruthenium-salt or complex and at least two transition metal salt or complex selected from the group consisting of palladium-salts, iridium-complexes, rhodium-salts and osmium-complexes wherein said solution comprises based on the transition metal content:
  a) 0.1 atomic-% to 10 atomic-% of rhenium or rhodium, or
  b) 0.1 atomic-% to 5 atomic-% of palladium, or
  c) 0.1 atomic-% to 20 atomic-% of osmium or iridium, balance ruthenium and incidental constituents and impurities.

17. A method of using an electrocatalyst according to claim 11, wherein said reduction is done by electroplating a ruthenium alloy from an electroplating bath comprising based on the transition metal content:
  (a) 0.0 atomic-% to 10 atomic-% of a rhodium or rhenium electroplating bath;
  (b) 0.1 atomic-% to 5 atomic-% of a palladium electroplating bath; and
  (c) 0.1 atomic-% to 20 atomic-% of an iridium or osmium electroplating bath,
  balance of a ruthenium electroplating bath produced by heating a solution of ruthenium(III) chloride and sulfamic acid.

18. A method of using an electrocatalyst according to claim 12, wherein said electrocatalyst is produced by electroplating in an electroplating bath wherein said palladium- and iridium-electroplating baths are produced by a process comprising the step of:
  bringing in contact a solution comprising
  (a) palladium chlorides, or
  (b) alkali hexachloroiridates or ammonium hexachloroiridate, or
  (c) rhodium sulfates
  and sulfamic acid or alkali sulfamates or ammonium sulfamates.

19. A method of using an electrocatalyst according to claim 17, wherein said rhenium-electroplating baths are comprising an alkali perrhenate or ammonium perrhenate.

20. A method of using an electrocatalyst according to claim 16, wherein said reduction of said metal ions is accomplished by reduction of a solution of transition metal salts comprising:
  (a) 0.0 atomic-% to 10 atomic-% of a rhodium salt;
  (b) 0.1 atomic-% to 5 atomic-% of a palladium salt; and
  (c) 0.1 atomic-% to 20 atomic-% of an iridium or osmium salt,
  (d) balance of a ruthenium salt
  by a solution of a borohydride.

* * * * *